United States Patent
Swami

(10) Patent No.: US 7,366,096 B2
(45) Date of Patent: Apr. 29, 2008

(54) SYSTEM AND METHOD FOR MOVEMENT DETECTION AND CONGESTION RESPONSE FOR TRANSPORT LAYER PROTOCOL

(75) Inventor: Yogesh Prem Swami, Irving, TX (US)

(73) Assignee: Nokia Corporation, Espoo (FI)

( * ) Notice: Subject to any disclaimer, the term of this patent is extended or adjusted under 35 U.S.C. 154(b) by 456 days.

(21) Appl. No.: 10/371,965

(22) Filed: Feb. 21, 2003

(65) Prior Publication Data

US 2004/0165538 A1 Aug. 26, 2004

(51) Int. Cl.
*H04J 1/16* (2006.01)
(52) U.S. Cl. .................. 370/231; 370/230; 370/235
(58) Field of Classification Search ........ 370/229–235, 370/310, 328–338
See application file for complete search history.

(56) References Cited

U.S. PATENT DOCUMENTS

| | | | |
|---|---|---|---|
| 5,912,878 A * | 6/1999 | Park et al. ................. | 370/229 |
| 6,272,148 B1 * | 8/2001 | Takagi et al. .............. | 370/469 |
| 6,601,101 B1 * | 7/2003 | Lee et al. .................. | 709/227 |
| 2002/0141353 A1 * | 10/2002 | Ludwig et al. ............ | 370/254 |

OTHER PUBLICATIONS

Caceres et al., "Improving the Performance of Reliable Transport Protocols in Mobile Computing Environments", Jun. 1995, IEEE Journal on Selected Areas in Communications, vol. 13, No. 5, pp. 850-857.*

M. Allman, V. Paxson, and W. Stevens, "TCP Congestion Control," IETF RFC 2581, Apr. 1999.

V. Paxson and M. Allman, "Computing TCP's Retransmission Timer," IETF RFC 2988, Nov. 2000.

M. Mathis, J. Mahdayl, S. Floyd, and A. Romanow, "TCP Selective Acknowledgment Options," IETF RFC 2018, Oct. 1996.

E. Rescorla, "HTTP Over TLS," IETF RFC 2818, May 2000.

Yogesh Swami and Khiem Le, "DCLOR: De-correlated Loss Recovery using SACK option for spurious timeouts," IETF Internet Draft, Nov. 2002.

* cited by examiner

*Primary Examiner*—Huy D. Vu
*Assistant Examiner*—Jason Mattis
(74) *Attorney, Agent, or Firm*—Hollingsworth & Funk, LLC

(57) ABSTRACT

A system, apparatus, and method for determining network capacity and managing network congestion in response to a change in an end-to-end communication path between sender and receiver hosts. A receiver mobility notification is provided by the receiver host to the sender host. The sender host determines whether the receiver host has moved between networks or sub-networks using the receiver mobility notification. If the sender host determines that the receiver host has moved from one network/subnet to another network/subnet, a congestion state at the sender host is reset to correspond to the new end-to-end communication path established between the sender host and the receiver host in the new subnet.

22 Claims, 12 Drawing Sheets

SYSTEM AND METHOD FOR MOVEMENT DETECTION AND CONGESTION RESPONSE FOR TRANSPORT LAYER PROTOCOL

FIELD OF THE INVENTION

This invention relates in general to communications, and more particularly to transport layer mobility detection and corresponding congestion response to accommodate situations involving user mobility.

BACKGROUND OF THE INVENTION

While computers are still used for their traditional processing purposes, advances in communication infrastructures and protocols have turned standard computing devices into valuable communication tools. Computers communicate with each other, and with other electronic devices, over networks ranging from local area networks (LANs) to wide reaching global area networks (GANs) such as the Internet. Other electronic devices have experienced similar transformations, such as mobile phones, personal digital assistants (PDAs), and the like. Today, these wireless devices are being used for a variety of different types of communication. For example, current and anticipated mobile phone technologies have transformed these wireless devices into powerful communication tools capable of communicating voice, data, images, video, and other multimedia content. PDAs, once the portable calendaring and organizational tool, now often include network communication capabilities such as e-mail, Internet access, etc. With the integration of wireless and landline network infrastructures, a multitude of information types can be conveniently communicated between wireless and/or landline terminals.

A primary enabler for such peer-to-peer communications is the advancement and integration of networking technologies. In order to facilitate open platforms and interoperability, data communications models have been established. A well-known architectural model is the International Standards Organization's (ISO) Open Systems Interconnect (OSI) reference model. The standard OSI reference model, also referred to as the protocol stack, includes seven layers that define the functions of communications protocols. Each layer of the model represents a function that is to be performed when data is between peer applications across a network(s). Within a functional layer, any number of protocols may be used to provide a suitable service to the function of that layer. The protocols of a layer communicate with peers of an analogous protocol in that layer on a remote system or device. There are also rules defining how the information is passed between layers within the stack.

One layer of the protocol stack is the transport layer. The function of this layer is to guarantee that the receiving device receives data just as it was sent. Some transport layer protocols are considered "connectionless," in that there is no handshaking to "establish" a virtual connection between sending and receiving devices. The User Datagram Protocol (UDP) is an example of one such connectionless transport layer protocol. However, other transport layer protocols provide a reliable, connection-oriented, byte-stream communication. These protocols will retransmit data for lost or damaged segments, and also establish logical end-to-end connections between the communicating hosts using handshaking techniques.

One well-known connection-oriented transfer layer protocol is the Transmission Control Protocol (TCP). TCP is the predominant transfer layer protocol used in Internet data transmissions. TCP provides reliability by retransmitting data unless it receives an acknowledgment from the receiving device that the data successfully arrived at the receiving device. TCP also utilizes a handshake to establish the logical end-to-end connection between the communicating devices. This protocol also views data as a continuous stream, and maintains the sequence in which bytes/octets are sent and received to facilitate this byte-stream characteristic.

The Stream Control Transmission Protocol (SCTP) is another connection-oriented transport layer protocol, which provides all the transport services that TCP provides. SCTP provides various functions that are different than that provided by TCP however, such as multi-streaming and multi-homing. Briefly, multi-streaming allows data to be partitioned into multiple streams that have the property of being delivered independently, so that segment/packet loss in any of the streams will only affect delivery within that stream and not in other streams. Another core feature of SCTP is multi-homing, which refers to the ability for a single SCTP endpoint to support multiple IP addresses.

Existing connection-oriented transport layer protocols, such as TCP and SCTP, were designed under the assumption that the end-to-end path of such protocol connections does not change during a session, and therefore the congestion control algorithms are triggered solely on packet loss or timeout information. A change in the end-to-end path may occur in wireline IP networks due to router failure or load balancing, however this does not occur very frequently. In addition, a change in route due to router failure nearly always results in TCP timeouts, since all the packets associated with the "old" route are lost.

But with user mobility the standard transport layer protocol assumption, that the end-to-end path of a such protocol connections does not change during a session, does not hold true. A receiver or sender may move from one network or sub-network ("subnet") to another network/subnet. This is particularly true in the case of mobile devices, which can move from location-to-location, cell-to-cell, network-to-network, etc. When there is a change of networks/subnets, the entire end-to-end path between the sender and receiver might change completely. A complete change in the end-to-end path may take place, for example, if a TCP receiver uses Mobile-IPv6 with route optimization to move from one subnet to another. The end-to-end path may also change where the receiver uses a first path in a first wireless "cell," and uses a second path when it moves to a second wireless cell. In such a case, the buffering capacity on the first and second paths may be significantly different from one another. In such a case, the sender's current estimate of the buffering capacity based on the first path, may be inaccurate with respect to the new second path on which communication is now established. A bad estimate of such buffering capacity can result in buffer overflow and consequently additional network congestion on the new path, ultimately reducing the throughput for the connection due to "timeouts."

Accordingly, there is a need in the communications industry for a manner of improving transport layer throughput and reducing network congestion in situations involving host mobility. The present invention fulfills these and other needs, and offers other advantages over the prior art network congestion approaches.

SUMMARY OF THE INVENTION

To overcome limitations in the prior art described above, and to overcome other limitations that will become apparent upon reading and understanding the present specification, the present invention discloses a system, apparatus and method for detecting host mobility and providing an appropriate congestion response to accommodate situations involving user mobility In accordance with one embodiment of the invention, a method is provided for determining network capacity and managing network congestion in response to a change in an end-to-end communication path between a sender host and a receiver host. The method includes receiving, at the sender host, a receiver mobility notification from the receiver host. The sender host determines whether the receiver host has moved from a first subnet to a second subnet, using the receiver mobility notification. If the sender host determines that the receiver host has moved from the first subnet to the second subnet, a congestion state at the sender host is reset to correspond to the new end-to-end communication path established between the sender host and the receiver host in the second subnet.

According to more particular embodiments of such a method, receiving the receiver mobility notification involves receiving the receiver mobility notification at the sender host by way of a transport layer protocol, such as TCP, SCTP, etc. In accordance with another particular embodiment of such a method, receiving the receiver mobility notification involves receiving a mobility flag in a header field of segments sent from the receiver host to the sender host. For example, the mobility flag may include one or more bits of the header field, where a first state of the mobility flag indicates that no receiver movement has occurred from the first subnet to the second subnet, and where a second state indicates that such movement has occurred.

In accordance with another embodiment of the invention, a method is provided for determining network capacity and managing network congestion in response to a change in an end-to-end communication path between a sender host and a receiver host. The method includes determining whether the receiver host has moved from a first subnet to a second subnet. Where the receiver host moves to a new location in such a manner, it results in a new end-to-end communication path between the sender and receiver hosts at the transport layer. The sender host is notified of the receiver host's movement via a transport layer protocol. The receiver movement is detected at the sender host using the transport layer notification. In response, a congestion state at the sender host is reset to accommodate the new end-to-end communication path.

In accordance with another embodiment of the invention, a host device is provided for communicating data with at least one remote device capable of moving between subnets during communication with the host device. The host device includes a memory to store a remote subnet flag that identifies a most recent state of the remote device's location known to the host device. A retransmission queue is provided, which collects non-acknowledged transport layer segments sent from the host device to the remote device. The state of the remote subnet flag at the time of transmitting the transport layer segments is thus stored with each of the transport layer segments in the retransmission queue. The host device includes a processor (circuit-based, chip-based, etc.) that is configured to compare the state of the remote subnet flags of the transport layer segments with a mobility flag in each corresponding acknowledgment segment provided by the remote device. The processor directs the resetting of a congestion state of a communication path between the host and remote devices, if the mobility flag indicates relocation of the remote device from the first subnet to the second subnet.

In accordance with another embodiment of the invention, a system is provided for facilitating data communication with at least one network including a plurality of subnets. The system includes at least one sender device for transmitting transport layer segments, and at least one receiver device for receiving the transport layer segments. The sender device includes a memory to store a remote subnet flag identifying a most recent state of the receiver device's location known to the sender device. The sender device further includes a retransmission queue of non-acknowledged transport layer segments sent from the sender device to the receiver device, where the state of the remote subnet flag at the time of transmitting the transport layer segments is stored with each of the transport layer segments in the retransmission queue. The sender device also includes a processor configured to compare the state of the remote subnet flags of the transport layer segments with a mobility flag in each corresponding acknowledgment segment provided by the receiver device. The processor is further configured to reset a congestion state of a communication path between the sender and receiver devices if the mobility flag indicates relocation of the receiver device from the first subnet to the second subnet. In one embodiment, the receiver device at any given time may transmit data, in which case it serves as a sender device. In such a case, the receiver device may also include the memory, retransmission queue, and processor to perform the functions of a sender device.

In more particular embodiments of such a system, a destination cache may also be provided, which is coupled to the receiver device to store receiver point of attachment information to the network. The receiver device sets the mobility flag to a state dependent on whether the receiver point of attachment has changed. In another particular embodiment, the network represents one or more of a wireless and a landline network, and in a more particular embodiment, the network includes a cellular network having a plurality of cells, where each of the cells corresponds to one of the plurality of subnets.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of an apparatus in accordance with the invention.

BRIEF DESCRIPTION OF THE DRAWINGS

The invention is described in connection with the embodiments illustrated in the following diagrams.

FIG. 8, including

DETAILED DESCRIPTION OF THE INVENTION

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

In the following description of the exemplary embodiment, reference is made to the accompanying drawings which form a part hereof, and in which is shown by way of illustration various embodiments in which the invention may be practiced. It is to be understood that other embodiments may be utilized, as structural and operational changes may be made without departing from the scope of the present invention.

As set forth above, connection-oriented transport layer protocols such as TCP and SCTP were designed under the assumption that the end-to-end path using such protocol connections does not change during a session, and therefore the congestion control algorithms are triggered solely on packet loss or timeout information. However, this assumption does not hold true in certain situations. For example, in cellular networks and networks using Mobile-IP (v4, v6) for example, the end-to-end path may change due to user mobility. More particularly, a mobile terminal user may move from one network or sub-network ("subnet") to another, thereby inherently changing the path between the mobile terminal and the network element(s) to which it was communicating prior to the change of subnets. The present invention provides a "lightweight" mobility detection scheme and corresponding congestion response methodology that may be used effectively when there is such a change of subnets. As used herein, the term "subnet" may include a portion of a network, or may refer to the entire set, i.e., network, to which the subnet is associated.

More particularly, TCP and other connection-oriented transport layer protocols dynamically measure end-to-end network capacity to avoid packet loss due to buffer overflows. The network capacity is measured in terms of Bandwidth Delay Product (BDP), and is maintained as a congestion control state by the TCP sender. As is known in the art, BDP generally refers to a measure of buffering capacity of all the routers on an end-to-end path in a network. The congestion state reflects the sender's estimate of the network's buffering space. In order to compute such an estimate, the sender may gradually increase the number of packets sent into the network, and may then rely on the acknowledgements (ACKs) received in order to dynamically adjust to the changes in the network. This method of estimation, however, implicitly assumes that the buffers being used remain the same for each packet sent into the network. In other words, the sender assumes that the end-to-end path of the network remains the same throughout the lifetime of the connection.

Figure 1:
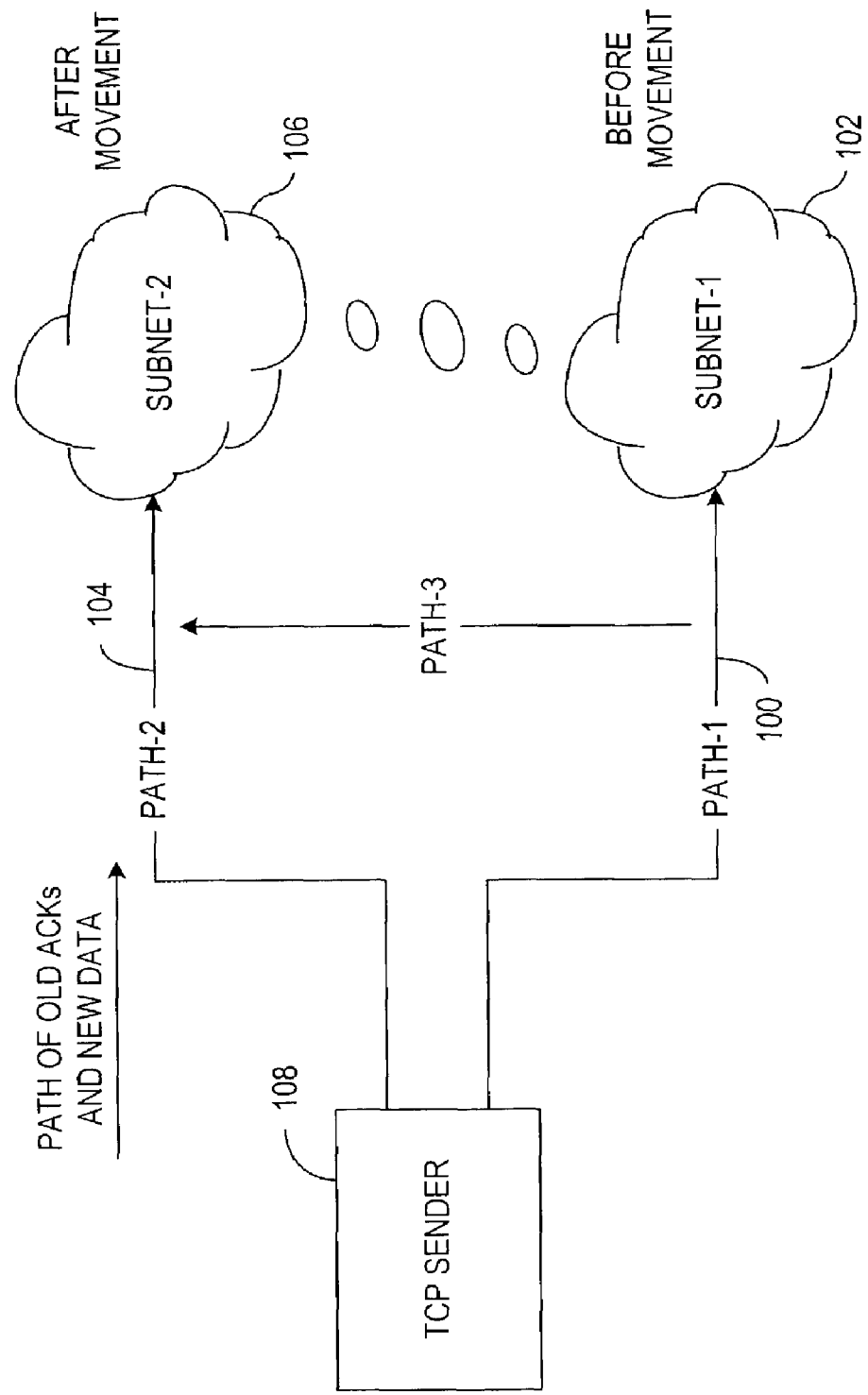
FIG. 1 is a block diagram illustrating the change of data paths as a result of a receiving host migrating to a new subnet.

However, the entire end-to-end path of the network may change due to a user's mobility which in essence invalidates the prior congestion state of the sender. This is illustrated in FIG. 1, which is a block diagram illustrating the change of data paths as a result of a receiving host ("receiver") migrating to a new subnet. As shown in FIG. 1, the TCP receiver may be using path-1 100 in one wireless cell depicted by subnet-1 102, and may be using path-2 104 when it moves to another cell/subnet 106. In this case, the BDP on path-1 100 may be substantially different from the BDP on path-2 104, or in other words, $BDP_{PATH-1} \neq BDP_{PATH-2}$. After movement, the TCP sender's 108 estimate of BDP on the new path may therefore be inaccurate. An inaccurate estimate of BDP may imply a significant buffer overflow that can cause network congestion (on path-2 104 in this case), and reduced throughput for the defaulting connection due to timeouts.

Therefore, to avoid packet loss and network congestion due to inaccurate estimates, a TCP sender 108 takes remedial action in accordance with the present invention. However, in many cases the TCP sender 108 will not know that a TCP receiver has moved from one subnet 102 to a new subnet 106, in which case the TCP sender 108 may not know whether it is using path-1 100 or path-2 104. For example, in the case of cellular networks, users' mobility is completely transparent outside the cellular network, such as between a TCP sender and a Gateway GPRS Support Node (GGSN). As is known in the art, a GGSN serves as a gateway between a General Packet Radio System (GPRS) mobile communications network and a packet switched public data network. A GGSN thus allows mobile subscribers to access public data networks and/or specified private networks. If the TCP sender 108 is located outside such a GGSN or analogous gateway, then the sender 108 will have no way of determining receiver mobility. The same holds true in networks that implement Mobile-IPv4, or Mobile-IPv6 (with reverse tunneling) for mobility management. While with Mobile-IPv6 a TCP sender may know about the receiver's mobility from the binding update and the destination cache if route optimization is enabled, route optimization is not mandatory in Mobile-IPv6, and the transport layer cannot exclusively rely on this.

Generally, the present invention provides a manner of detecting such user mobility at the transport layer, and provides one or more manners of response in the event of the detection of user mobility. In accordance with one embodiment of the invention, a system and methodology, referred to herein as Lightweight Mobility Detected and Response (LMDR), provides the desired detection and response to accommodate mobile scenarios. Using the present invention, the sender can detect the mobility of the receiver at the transport layer, regardless of the type of underlying network architecture (e.g., cellular networks, networks using various versions of Mobile-IP as a mobility manager, etc.). Further, the sender can reset its congestion state after there is a change(s) in the point of attachment (POA) of a receiver, which is not currently performed due to the sender having no way of reliably knowing of such a change in the receiver's POA.

The present invention may be implemented in any connection-oriented transfer layer protocol, such as TCP, SCTP, etc. For ease of description, reference may be primarily made to "TCP" in the ensuing description. However, the invention is equally applicable to SCTP or other similar protocols as will be readily apparent to those skilled in the art from the description provided herein.

Figure 2:
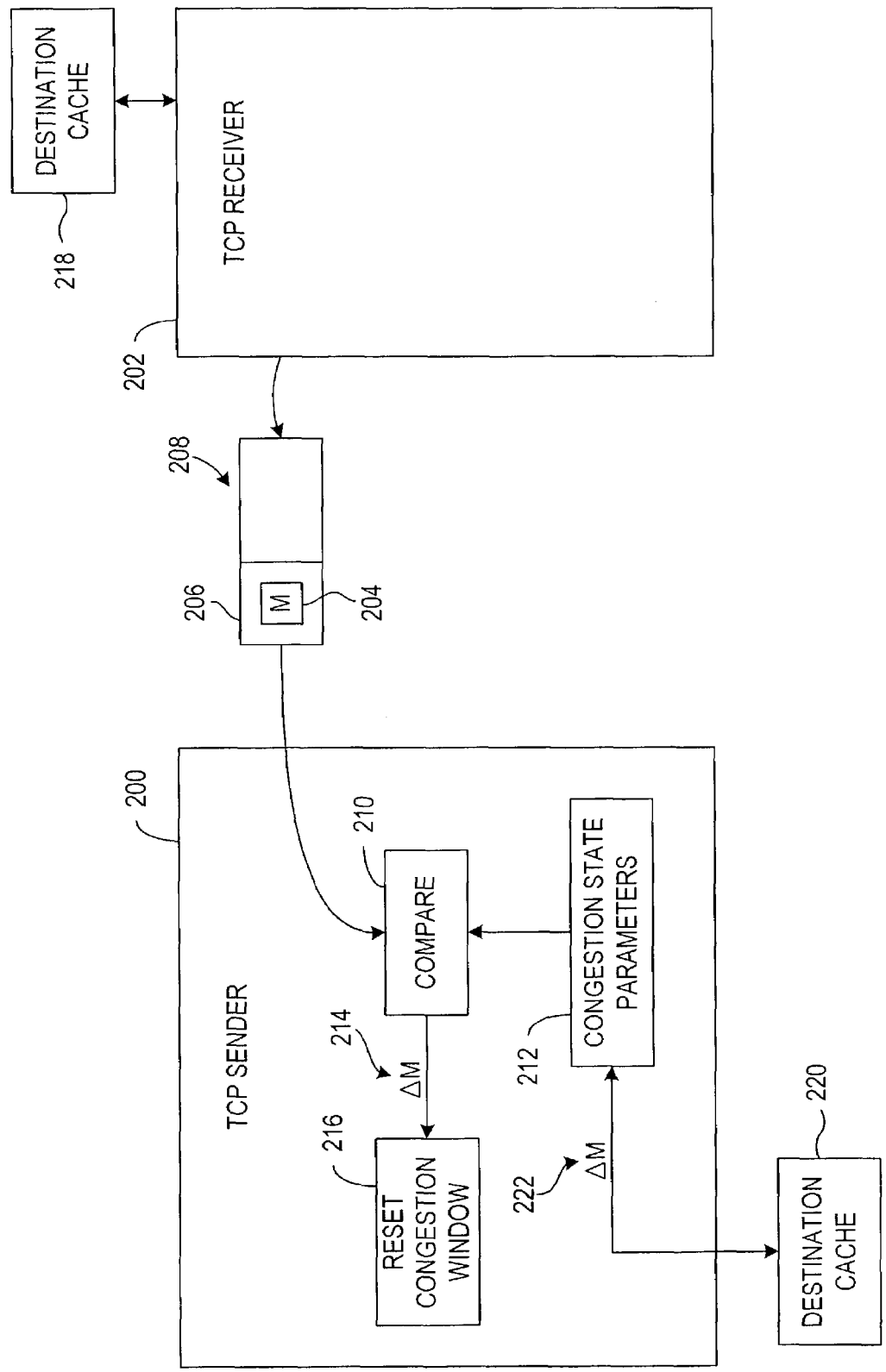
FIG. 2 is a block diagram illustrating one manner in which host mobility may be detected and a response to a new congestion situation for the new path may be managed in accordance with the present invention.

FIG. 2 is a block diagram illustrating one manner in which host mobility may be detected and a response to a new congestion situation for the new path may be managed in accordance with the present invention. In this (and other) representative embodiments, TCP is assumed as the transport layer protocol, although the invention is equally applicable to other transport layer protocols. A TCP sender 200 and TCP receiver 202 communicate information therebetween. Either the sender 200 and/or the receiver 202 may be in a situation where it may move between networks/subnets, such that the established communication path is disrupted. In accordance with the present invention, a Mobility (M) flag 204 is implemented in the TCP (or other transport layer protocol) header 206 of the segment 208 to indicate whether the TCP receiver 202 is still in the same subnet. The M flag 204 may be implemented using one or more bits, and in one embodiment of the invention is implemented using a single bit. When the TCP receiver 202 moves from one subnet to another, it toggles the M flag bit 204 and uses the new value of M as long as the TCP receiver 202 stays in the new subnet. The TCP sender 200 maintains a state indicating the last value of M 204 from the receiver 202. If the incoming acknowledge signals (ACKs) have the same M bit, the sender 200 concludes that the receiver 202 is still in the same subnet. If the value of M flag 204 changes, the sender 200 concludes that the receiver 202 has changed subnets. Since the value of M is provided in each segment 208, the scheme is very robust to segment/packet or ACK losses. In addition, the scheme is very "lightweight" in that it does not require any additional overhead, apart from a small number of new states maintained by each sender 200 and receiver 202.

The sender 200 can thus detect receiver 202 mobility by comparing 210 or otherwise analyzing the M flags 204 with respect to stored congestion state parameters 212. A difference in M flags, ΔM 214, can trigger the reset congestion window module 216. In other words, in response to detecting receiver 202 movement between subnets using the M flag 204 and maintained congestion state parameters 212, the TCP sender 200 attempts to reset the congestion window (cwnd) to account for the change of paths. The present invention contemplates various methodologies for providing such a response, which are described more fully below.

The receiver 202 may determine that it has changed subnets by monitoring, for example, its destination cache or other module 218 revealing routing information from which receiver subnet movement can be ascertained from a change in the receiver's 202 point of attachment (POA). If the receiver determines a change in the POA, the receiver 202 will change the state of the M flag 204, which can then be detected by the sender 200. Analogously, the sender 200 can monitor its own destination cache or other module 220 revealing routing information from which sender subnet movement can be ascertained. In the case of sender 200 movement, a ΔM 222 can be used to update the congestion state parameters 212 and ultimately the M flag when a segment is sent to the receiver 202, thereby allowing the receiver 202 to determine sender 200 mobility. It should be recognized that at any given time, the functions of the sender 200 and receiver 202 may switch such that the sender 200 becomes the receiver and the receiver 202 becomes the sender. Therefore, reference to a TCP "sender" and TCP "receiver" relates to the relative functionalities of such hosts with respect to the direction in which data is being transmitted.

Using the present invention, the TCP throughput may be improved while reducing network congestion. Further, the present invention does not adversely affect the performance or workings of traditional wireline networks. Existing TCP implementations that choose not to support mobile hosts will not require any change. Further, the present invention works with all underlying mobility management technologies.

Figure 3:
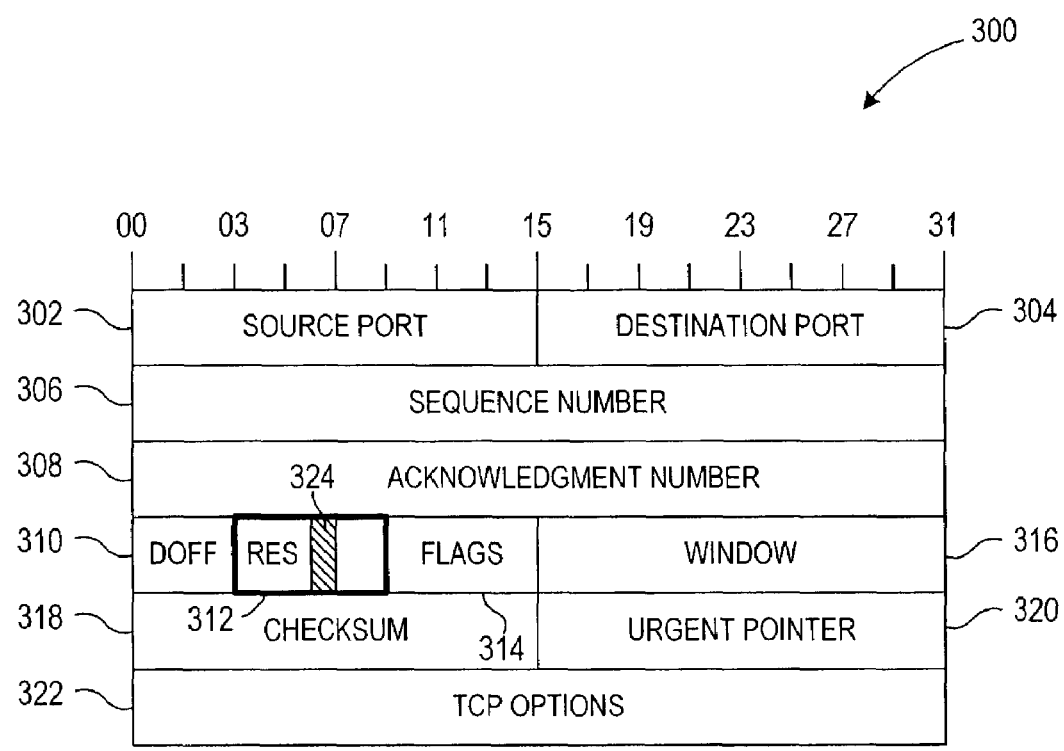
FIG. 3 is a diagram illustrating a representative TCP header incorporating an indicator from which host mobility can be determined in accordance with the principles of the present invention.

To provide a lightweight network layer-independent mobility detection scheme at the transport layer, an indicator is used from which mobility can be determined. As indicated above, one embodiment of the invention utilizes at least one bit from the transport protocol header. FIG. 3 is a diagram illustrating a representative TCP header 300 incorporating such a bit, an M bit, in accordance with the principles of the present invention. The illustrated TCP header 300 is thirty-two bits wide (0-31), and includes a number of fields. Sixteen-bit source 302 and destination 304 ports identify the source and destination host addresses respectively. The sequence number 306 represents the initial sequence number (ISN) during sequence number synchronization (i.e., when the SYN bit within the flags 314 is set), and the first data octet in the segment when the SYN bit is not set. The acknowledgment number 308 contains the value of the next sequence number the sender of the segment is expecting to receive, if the ACK control bit of the flags 314 is set. Once a connection is established, an ACK number in field 308 is always sent. The data offset (DOFF) field 310 indicates the number of 32-bit words in the header 300, to identify where the data begins. The reserved bits 312 are reserved for future use, and as described more fully below, is where the M bit is located in accordance with one embodiment of the invention. The flags 314 include a number of identifiers, such as the urgent pointer valid flag (URG), acknowledgement number valid flag (ACK), push flag (PSH), reset connection flag (RST), synchronize sequence numbers flag (SYN), and the end of data flag (FIN). The window field 316 holds the number of data octets beginning with the one indicated in the ACK field 308 that the sender of this segment is willing to accept. The checksum 318 field stores a standard checksum value to provide for reliability of the connection, and the urgent pointer field 320 communicates the current value of the urgent pointer as an offset from the sequence number 306 in the segment. The TCP options field(s) 322 are optional fields used to convey specific information in specific cases. For example, a TCP Selective Acknowledgment (SACK) option may be utilized by way of the TCP options 322 such that receiving TCP sends back SACK packets to the sender to inform the sender of data that has been received.

In accordance with one embodiment of the present invention, the M bit is implemented in the reserved field 312, as shown by the M bit field 324. The present day TCP reserved field already utilizes at least two of the reserved bits in field

312, including the CWR and ECR bits (not shown) that identify when a sender or receiver, respectively, cuts the congestion window in half. Any unused reserved field 312 bits may be used to house the M bit(s) 324. It should be noted that an M flag in accordance with the present invention may be included in any location(s) of a transport layer protocol header, and is limited only by existing and/or defined header fields and the practicalities associated with reorganizing or otherwise moving fields/bits within such a header. It should also be noted that an M flag could alternatively be provided via a different encapsulating header, trailing bits, or any other available location in which such a designator can be transmitted. However, in an exemplary embodiment of the invention, the M flag 324 is provided via one of the bits of the reserved field 312 of the TCP header 300, due to the availability and convenience of doing so.

Figure 4:
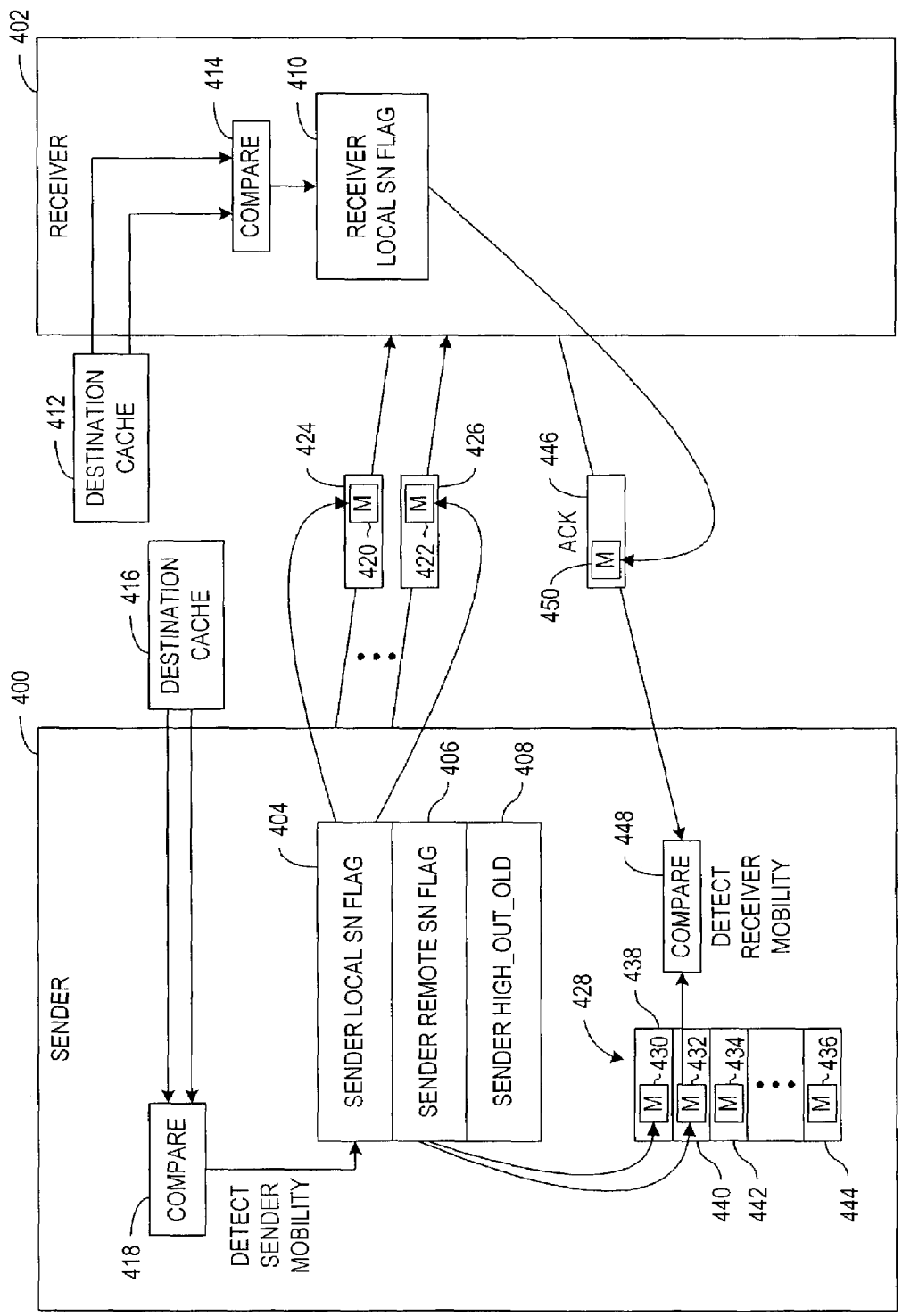
FIG. 4 is a block diagram illustrating an exemplary manner in which user mobility can be detected in accordance with the present invention.

As previously indicated, the present invention involves detecting user mobility at the transport layer, and providing an appropriate response when such mobility is detected. FIG. 4 is a block diagram illustrating an exemplary manner in which user mobility can be detected in accordance with the present invention. The illustrated embodiment uses the M flag (one bit in this example) in the TCP header to monitor for user mobility. This is described below in terms of a TCP sender 400 and TCP receiver 402, where it will be assumed for purposes of explanation that the TCP receiver is implemented in a mobile device that can move between various subnets.

Each TCP implementation maintains a number of state variables to facilitate mobility detection. In the illustrated embodiment, these state variables include a sender local subnet (SN) flag 404 (e.g., my_subnet_flag), a sender remote SN flag 406 (e.g., remote_subnet_flag), and a sender variable 408 identifying the highest sequence number of the packet when a TCP receiver detects that its peer host has changed its POA to the network (e.g., high_out_old). Thus, the flags 404, 406 (1-bit values in one embodiment) hold the mobility state information about the local TCP host and the remote TCP host respectively, and the high_out_old 408 represents the highest sequence number of the packet when a TCP receiver detects that its peer host has changed its POA to the network. This state information is used to make POA change information more robust to packet reordering and packet duplication. In one embodiment of the invention, all these state parameters are initialized to zero at the start of the connection.

At connection set up, both the hosts (e.g., client/server) that are willing to utilize mobility detection should set M equal to a predetermined state (e.g., M=1) in the SYN packets sent by TCP client and server. Connection set up is symmetric, so either a TCP sender or a receiver can initiate a connection. If either (or both) of the SYN packets indicates that M=0, then the TCP sender should stop processing the LMDR scheme, as this indicates that at least one of the client/server is unwilling or otherwise unequipped to handle mobility detection in accordance with the invention. Once both the entities know that the sender and receiver have mobility detection capabilities, the TCP sender and receiver should initialize their respective local and remote SN flags. For example, from the sender 400 point of view, the sender local and remote SN flags 404, 406 are initialized. In one embodiment of the invention, this initialization is effected as shown in Equation 1 below:

$$my\_subnet\_flag=1$$

$$remote\_subnet\_flag=1 \quad \text{Equation 1}$$

Therefore, the sender's 400 my_subnet_flag (representing the sender local SN flag 404) is set to "1" and the sender's 400 remote_subnet_flag (representing the sender remote SN flag 406) is also set to "1." The receiver 402 would initialize such local variables in an analogous fashion (e.g., initialize receiver local SN flag 410 to "1" and receiver remote SN flag (not shown) to "1").

For each packet sent, both of the TCP hosts should check their destination cache/routing cache, or other analogous module revealing routing information from which host subnet movement can be ascertained (hereinafter referred to as "destination cache"). By monitoring the destination cache, a host can determine if its point of attachment (POA) has changed. For example, the TCP receiver 402 can monitor its destination cache 412, and compare 414 previous and current POA indicators to determine if its POA has changed. If so, the receiver local SN flag 410 (e.g., the my_subnet_flag variable maintained at the receiver 402) can be changed as shown in Equation 2 below:

$$my\_subnet\_flag=\sim(my\_subnet\_flag) \quad \text{Equation 2}$$

In Example 2, the "~" represents a binary NOT operation, such that Equation 2 represents a toggling operation of the my_subnet_flag variable. Analogously, the TCP sender 400 can monitor its destination cache 416, and compare 418 previous and current POA indicators to determine if its POA has changed. If so, the sender local SN flag 404 (e.g., the my_subnet_flag variable maintained at the receiver 400) can be toggled in the same fashion as set forth in Equation 2 above.

It should be noted that many TCP implementations currently monitor their destination caches for other purposes, such as to check Maximum Transmission Unit (MTU) size. The MTU is the largest size packet that can be sent in a packet-based network, such as the Internet, GPRS network, etc. TCP uses the MTU to determine the maximum size of each packet in any transmission. Because TCP implementations often monitor destination caches already for information such as the MTU, monitoring for a change of subnets is therefore not a difficult task to include.

Before sending each packet, the TCP sender 400 should set the value of the M bit in the TCP header as shown in Equation 3 below:

$$M=my\_subnet\_flag \quad \text{Equation 3}$$

This is illustrated in FIG. 4, where the sender local SN flag 404 (i.e., my_subnet_flag) is included as the M bit 420, 422 in packets 424, 426 sent to the receiver 402. In addition, the TCP sender 400 sets the value of the M bit in the retransmission queue 428 as shown in Equation 4 for each respective packet sent:

$$M=remote\_subnet\_flag \quad \text{Equation 4}$$

For example, the sender remote SN flag 406 is set for each of the M bits 430, 432, 434, 436 in respective packets 438, 440, 442, 444. The value of the M bit stored in the retransmission queue 428 is set to the sender remote SN flag 406 (remote_subnet_flag), because when the TCP sender 400 receives the ACK 446 for that segment, the sender 400 can determine a change in subnet by comparing 448 the M bit 450 of the ACK 446 with the respective stored M bit (e.g., M bit 432) in the retransmission queue 428. If the M bit 432 is not equal to the M bit 450 received via the ACK 446, this indicates that a change in subnet has taken place. This is because the receiver 402 will have changed the state of its M bit using Equation 3 above when sending the ACK 446, due to its recognition of a change of POA.

Figure 5:
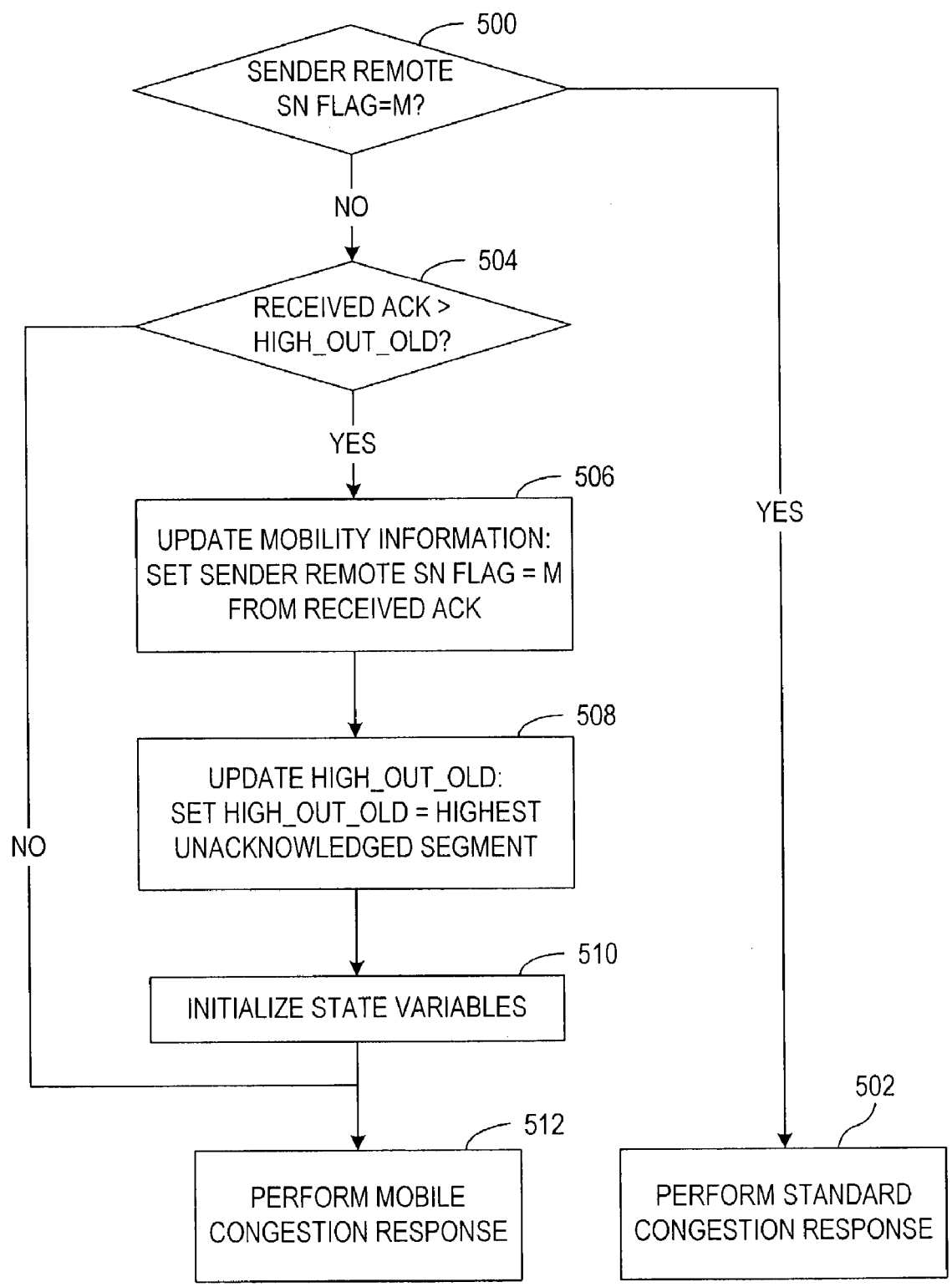
FIG. 5 is a flow diagram illustrating one embodiment for detecting remote host mobility in accordance with the present invention.

It can be assumed that a TCP sender can detect its own mobility, for example, by looking into its destination cache. In such case, the TCP sender can directly enter a congestion response mode. However, in accordance with one embodiment of the invention, a remote mobility detection procedure is performed when a TCP endpoint receives a new packet. Such a procedure provides for detection of the mobility of the other host. FIG. 5 is a flow diagram illustrating one embodiment for detecting remote host mobility in accordance with the present invention. The example of FIG. 5 is a representative example of how remote host mobility may be detected, and many variations may also be used in connection with the present invention.

Referring now to FIG. 5, it is first determined for each TCP packet received whether the sender remote SN flag is equal to the M bit provided in the received TCP packet. This determination is depicted at decision block 500. In one embodiment, a state variable remote_subnet_flag is used as the sender remote SN flag, such that it is therefore determined whether remote_subnet_flag=M. If remote_subnet_flag=M, this indicates that the remote host has not moved to a new subnet, and a standard congestion response may be performed 502. A standard congestion response may be used in such a case since no remote host movement between networks/subnets occurred that would change the communication path. An example of such a standard congestion response methodology is described in IETF RFC 2581 (April 1999), entitled "TCP Congestion Control," by M. Allman, V. Paxson, and W. Stevens. Any predefined standard congestion response methodology may be utilized.

If it is determined 500 that remote_subnet_flag does not equal M, it is then determined 504 whether the received ACK has an ACK number (see TCP header field 308 of FIG. 3) that is greater than the high_out_old variable (see high_out_old 408 of FIG. 4). If so, the mobility information is updated 506, such that the sender remote SN flag is set to M. More particularly, the remote_subnet_flag is set to M provided in the packet. Further, the high_out_old is updated 508 such that it is set to equal the highest unacknowledged packet, where the highest unacknowledged packet represents the sequence number of the last octet in the retransmission queue. At this point, the TCP sender initializes state variables, such as shown in Equation 5 below:

old_outstanding=cwnd cwnd=cwnd+INIT_WINDOW

SS_THRESH=INFINITE    Equation 5

Further, the retransmission timer is restarted if a new ACK is received. The variables initialized as shown in Equation 5 are then used in performing 512 a mobile congestion response, the operation of which is described more fully below. It is also noted that if the received ACK does not have an ACK number that is greater than the high_out_old variable, the mobile congestion response may be directly performed 512.

Figure 6:
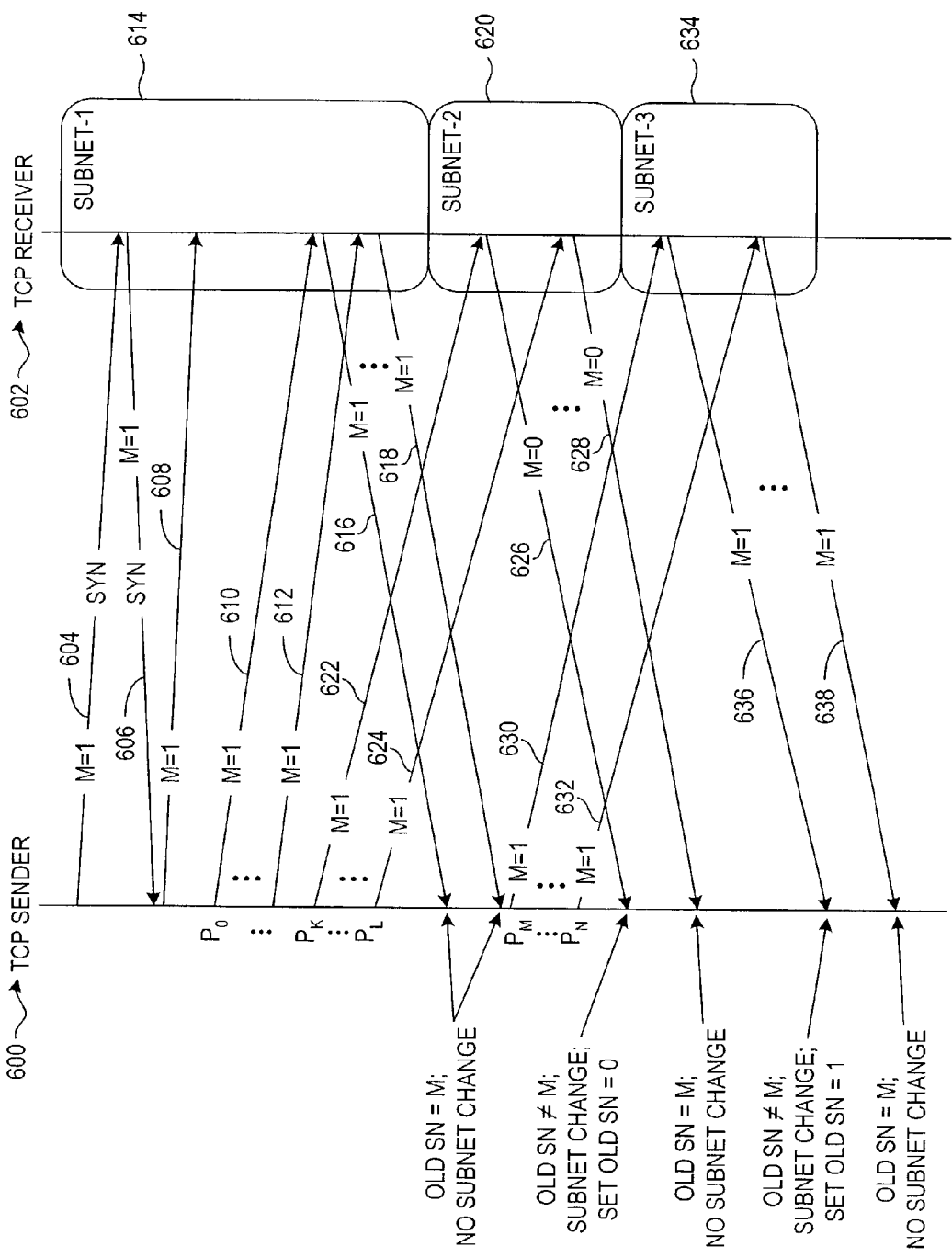
FIG. 6 illustrates an operational example of one manner in which a TCP sender detects changes in the point of attachment of a TCP receiver.

FIG. 6 illustrates an operational example of one manner in which a TCP sender 600 detects changes in the POA of a TCP receiver 602. In this example, it is assumed that the state variables are initialized such that the SYN and SYN/ACK packet transmissions begin with M=1. As is known in the art, control information referred to as a handshake is exchanged between the two endpoints of a TCP communication to establish a dialogue before data is transmitted. The type of handshake generally utilized by TCP is referred to as a three-way handshake, due to the exchange of three segments to establish the dialogue. For example, the TCP sender 600 begins the connection by sending the TCP receiver 602 a segment with the SYN bit of the header "flags" field set (see field 314 of FIG. 3). This is shown in FIG. 6 on segment 604, where M=1 as previously indicated. This segment tells the TCP receiver 602 that the TCP sender 600 wants to establish a connection, and also tells the TCP receiver 602 what sequence number the TCP sender 600 will use as a starting number for its segments. In response, the TCP receiver 602 sends a segment 606, also with M=1, that has both the SYN and ACK bits set and identifies the sequence number that the TCP receiver 602 will start with. In response to segment 606, the TCP sender 600 sends a segment 608 providing at least an ACK. Assuming both the TCP sender 600 and receiver 602 agree to mobility detection, the M bit will be set to "1" in each of the segments of the handshake.

The TCP sender 600 then begins to transfer data. The packets $P_0$ through $P_N$ represent data packets sent by the TCP sender 600. For example, a first number of packets 610 through 612 are sent by the sender 600 to the receiver 602 while the receiver 602 is in a first subnet-1 614. The TCP receiver 602 responds to each of these packets with an ACK packet 616 through 618, with M=1 since the receiver 602 has not moved from subnet-1 614. The TCP sender recognizes this non-movement by receiver 602 by comparing the received M bit from the ACK packet and the corresponding packet entry in the retransmission queue, which indicates that the subnet has not changed (e.g., the old subnet=M). In this case, any standard (i.e., non-mobility-based) TCP congestion procedure may be used.

If the receiver 602 moves to a new subnet, as depicted by subnet-2 620, the TCP receiver 602 will recognize this movement by way of, for example, monitoring its destination cache. When the TCP receiver 602 recognizes a change of the POA in this fashion, the receiver 602 toggles its my_subnet_flag, and uses this value for new M designations. This can be seen for packets 622 through 624, which were sent by the TCP sender 600, and received by the receiver 602 when it had moved to subnet-2 620. In this case, the receiver 602 responds with ACK packet 626 where the M bit has been toggled to "0" in this case. The TCP sender recognizes this movement by comparing the received M bit from the ACK packet and the corresponding packet entry in the retransmission queue, which indicates that the subnet has changed (e.g., the old subnet ≠M). In this case, the TCP sender then sets the old subnet to "0," e.g., by changing the remote_subnet_flag to reflect the new state of M bit. Packets then sent by the TCP sender 600 will then be stored in the retransmission queue with the new state of the M bit, to detect further receiver 602 subnet changes.

FIG. 6 further illustrates that subsequent packets received from the receiver 602 from subnet-2 620 will include an M bit having state M=0, as shown by packet 628. At this point, the TCP sender 600 will have changed its remote_subnet_flag, and thus will identify packet 628 as having an old subnet equal to M (both "0" in this case). The TCP sender 600 may transmit further packets, such as packets 630 through 632. The TCP receiver 602 receives these packets, but has again moved to a new subnet, namely subnet-3 634. When the TCP receiver 602 recognizes a change of the POA when moving to subnet-3 634, it again toggles its my_subnet_flag (to "1" in this case), and uses this value for new M designations as seen in connection with packets 636 through 638. In response to packet 630 sent by the TCP sender 600, the receiver 602 therefore responds with ACK packet 636 where the M bit has been toggled to "1". The TCP sender recognizes this movement by comparing the received M bit from the ACK packet and the corresponding packet entry in the retransmission queue, which indicates that the subnet has again changed (e.g., the old subnet ≠M). In this case, the TCP sender then sets the old subnet to "1," e.g., by again changing the remote_subnet_flag to reflect the new state of M bit. Packets then sent by the TCP sender 600 will then be stored in the retransmission queue with the new state of the M bit, to detect further receiver 602 subnet changes. Subsequent packets from the TCP receiver 602 then include M=1, which the TCP sender 600 now recognizes as being in the same subnet-3 634 as the previous packet(s) 636.

Figure 7:
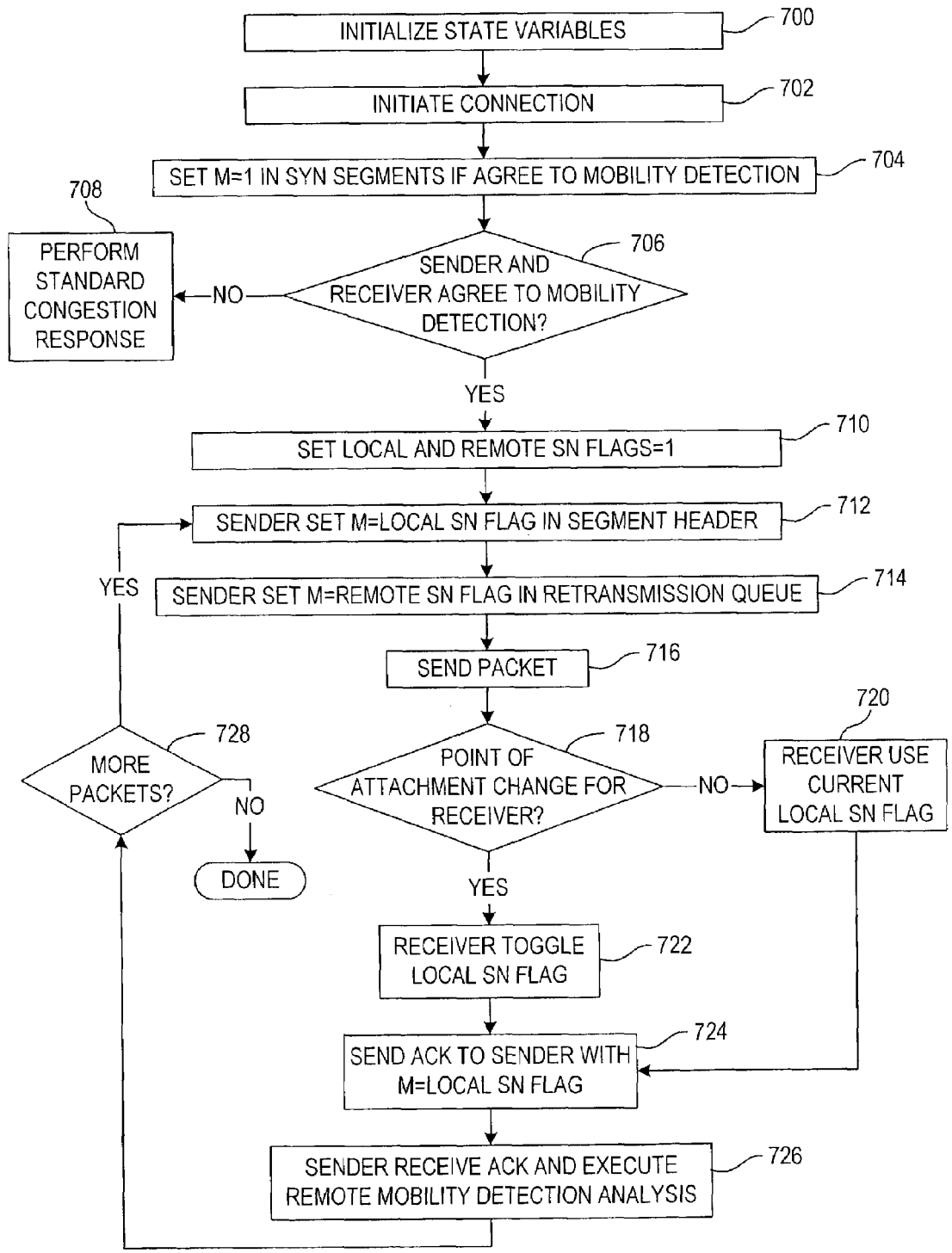
FIG. 7 is a flow diagram illustrating one embodiment of an initialization and mobility detection methodology in accordance with the present invention.

FIG. 7 is a flow diagram illustrating one embodiment of an initialization and mobility detection methodology in accordance with the principles of the present invention. The flow diagram of FIG. 7 incorporates aspects of FIGS. 4, 5, and 6 as it pertains to initialization and mobility detection. State variables are initialized 700, such as setting the local SN flag (e.g., my_subnet_flag, remote SN flag (e.g., remote_subnet_flag), and high_out_old to zero. It should be recognized that the specific initialization state is not relevant to the present invention, but rather that the initial states of these variables is set to an initial, known state. In one embodiment of the invention, this initial, known state is set to binary "0." The connection is initiated 702, where a TCP handshake procedure is performed. Assuming that the state variables were initialized to "0," then the M flag is set 704 to "1" in the SYN segments of the sender and receiver if they respectively agree to (e.g., are capable of) mobility detection. If it is determined 706 that one or both the sender and receiver do not agree to mobility detection, standard congestion response techniques may be used as shown at block 708. Otherwise, the local and remote SN flags (my_subnet_flag; remote_subnet_flag) are set 710 to "1."

Prior to sending a packet, the sender sets 712 M equal to the local SN flag in the segment header, and sets 714 M equal to the remote SN flag in the retransmission queue. The packet is then sent 716. If the point of attachment (POA) has not changed at the receiver, the receiver will use 720 its current local SN flag (receiver my$_{\_subnet\_}$flag) to create the M flag, and send 724 the ACK to the sender with M equal to the receiver's current local SN flag. If the receiver's POA has changed as determined at decision block 718, the receiver toggles 722 its local SN flag. Toggling this flag assumes a single-bit M flag, and any state(s) can be used to designate a change of POA in multi-bit M flags. For example, if the M flag is a two-bit field, the state can change from "00" to "01," "10," or "11" to designate receiver mobility. In the illustrated embodiment however, the M flag is assumed to be a single-bit field, such that toggling the state from "1" to "0," for example, appropriately identifies a change of receiver subnets.

The sender receives 726 the ACK with the receiver's local SN flag as the M flag. Depending on the state of the M flag, the sender will execute the appropriate remote mobility detection analysis. For example, the flow diagram previously described in connection with FIG. 5 provides one embodiment in which the sender can execute the remote mobility detection analysis. If more packets are to be sent as determined at decision block 728, the process can continue to block 712.

In accordance with one embodiment of the invention, a congestion response methodology is used after user mobility detection occurs. For example, one embodiment of the invention involves determining whether one or more users have moved between networks and/or subnets, and applying an appropriate congestion response methodology in response thereto. Therefore, in some instances, a standard congestion response algorithm may be implemented. The realization and benefits of standard congestion response algorithms may be determined in a manner described herein, and/or via known congestion response algorithms such as IETF RFC 2581 (April 1999), entitled "TCP Congestion Control," by M. Allman, V. Paxson, and W. Stevens, the content of which is incorporated herein by reference.

Briefly, standard congestion response methodologies may include interoperable concepts such as slow start, congestion avoidance, fast retransmit, fast recovery, and/or other congestion control algorithms. Slow start (SS) and congestion avoidance algorithms are used by a sender to control the amount of outstanding data being introduced into the network. Generally, congestion control uses various parameters, including the congestion window (cwnd) and the slow start threshold (SS_THRESH). The cwnd is a state variable that refers to the sender-side limit of the quantity of data that the sender can transmit into the network before receiving an acknowledgement (ACK). The SS_THRESH is a threshold value used to determine whether the slow start or congestion avoidance algorithm should be used to control data transmission. When segments are first introduced into the network, the conditions are unknown, and the transport layer may slowly probe the network to ascertain the available capacity for the particular path. This is performed to minimize the chances of causing congestion in the network.

For example, where TCP is used as the transport layer protocol, the TCP may set the cwnd to one Maximum Segment Size (MSS), and send one full-sized segment. If this segment is acknowledged (ACK'd) before the timeout, the sender may increase the cwnd by one MSS and send out two full-sized segments. SS_THRESH may initially be set to a high value (e.g., 0xFFFF, hereinafter referred to as INFINITE). The process of increasing the cwnd and sending out additional full-sized segments may continue as long as the cwnd is below SS_THRESH, and the ACKs arrive before their corresponding timeouts. This is referred to as the "slow start" phase, at which time cwnd may grow exponentially. Thus, slow start may be used when data transfers are initiated, or in response to detected segment loss, or in any event when cwnd<SS_THRESH. Slow start ends when cwnd>SS_THRESH, or when congestion is identified. Congestion avoidance methodologies may thus be initiated when cwnd>SS_THRESH. In one implementation, cwnd grows linearly once reaching the SS_THRESH. For example, cwnd may be incremented by one full-sized segment per round-trip time (RTT). Other formulas may be used to update cwnd as well. When congestion is detected (e.g., when a retransmission timeout occurs), the SS_THRESH may be set to a lesser value such as one half the current cwnd, and cwnd may be reset to one MSS. Other congestion control mechanisms may alternatively be used.

In accordance with one embodiment of the invention, certain congestion responses are provided after user's mobility detection occurs. Mobility results in a new communication path, which also results in a new Bandwidth Delay Product (BDP) as seen by the sender. The BDP represents the product of RTT and the estimated minimal bandwidth between the sender and receiver. Since a TCP sender is unaware of the BDP on the new path, it renegotiates the congestion control parameters. To negotiate new congestion parameters, a TCP sender resets its SS_THRESH to a large value INFINITE (e.g., 0xFFFF) and updates its effective congestion window on the new path to the initial window size init_wnd. Unlike in the case of a new connection where the number of outstanding packets is zero, a connection after a change of subnets will typically have more than zero outstanding packets. In addition, it is possible that one or more of these outstanding packets (or ACKs) were lost in the network. The mobility response algorithm therefore takes these additional complexities into account for its response.

Based on the above considerations, it is possible to have a number of response algorithms using different sets of TCP options to make it more robust to network impairments, such as packet loss, packet reordering, and packet duplication. Two such schemes are described below, including a first mobile congestion response methodology that does not require any TCP options (but may be less robust), while the other utilizes the TCP SACK option (but is more robust). These described mobile congestion response methodologies are provided for purposes of illustration, and other response algorithms may be used in connection with the present invention.

A first representative congestion response scheme used after mobility detection involves no TCP options. As is known in the art, TCP options may be included with a packet header (see TCP options field 322 of FIG. 3). Existing options include, for example, a specification of the maximum segment size (MSS) that the receiver should use, selective acknowledgment (SACK) extensions, echo options for measuring the RTT, timestamps, and the like. In accordance with one embodiment of the invention, a congestion response scheme after mobility detection requires no such TCP options.

To reset the congestion state, a TCP sender maintains information identifying which packets were sent into which subnet so that when a change of subnet is detected, the TCP sender does not increase its congestion window based on the ACK information generated from the "old" subnet (i.e., the subnet prior to the movement between subnets). The state variable high_out_old maintains the highest sequence number of data packets sent at the time when the change of subnet was detected, and thus indicates the highest sequence number of data that was sent in the old subnet.

In addition, the TCP sender also maintains another state variable that estimates the number of packets that was sent into the old subnet. In the event of packet loss, and recognizing that the TCP sender does not know if the duplicate ACK was generated for packets sent into the old or new network, such a count helps estimate the number of packets that were sent into the old network. The variable used for this count is referred to herein as old_outstanding.

After a change of subnet is detected in accordance with one embodiment of the invention, a quantity of data corresponding to INIT_WINDOW is sent, and no expansion of the congestion window is effected until all packets having sequence numbers up to high_out_old are recovered. In one embodiment, packets with sequence numbers less than high_out_old are recovered one lost packet per RTT.

Figure 8A:
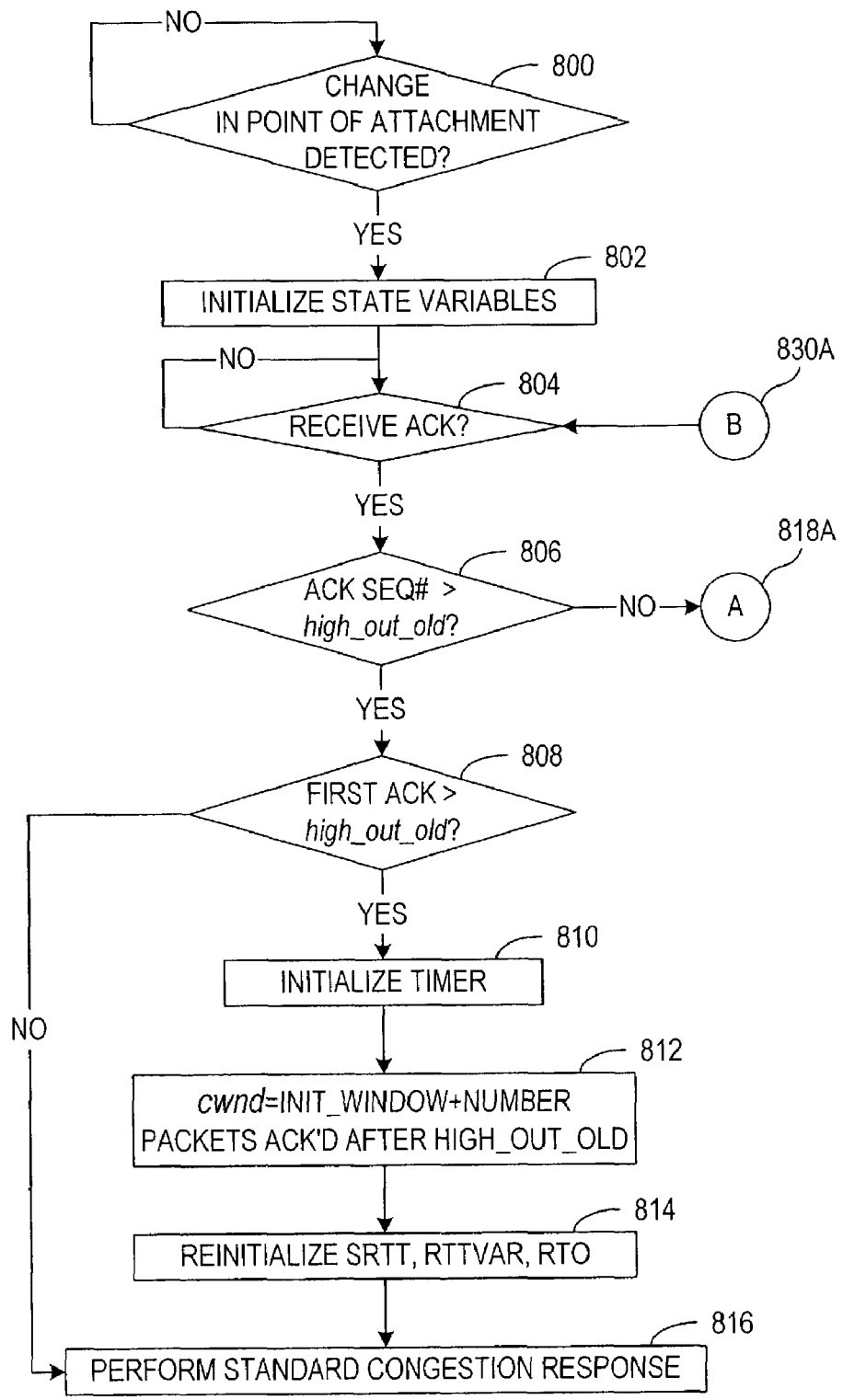
FIGS. 8A and 8B, is a flow diagram illustrating one embodiment of a method for providing a congestion response after mobility detection, where no TCP options are utilized.
Figure 8B:
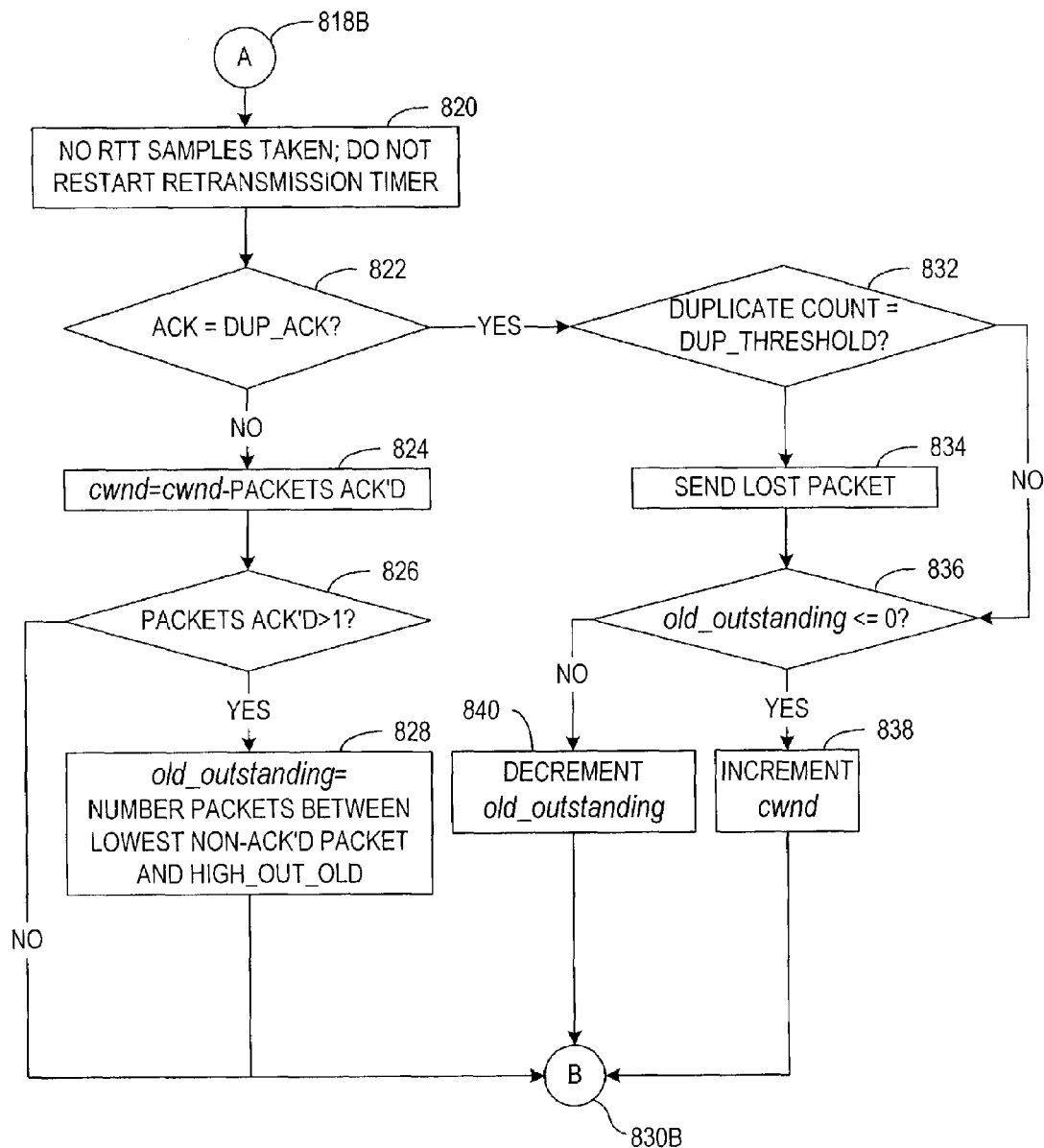

FIG. 8, including FIGS. 8A and 8B, is a flow diagram illustrating one embodiment of a method for providing a congestion response after mobility detection, where no TCP options are utilized. When a change in the point of attachment is detected as determined at decision block 800, various state variables are initialized 802, such as those shown above in Equation 5 and reproduced below:

old_outstanding=cwnd cwnd=cwnd+INIT_WINDOW

SS_THRESH=INFINITE

Further, the retransmission timer is restarted if a new ACK is received. Since the congestion window cwnd is updated to a new value, the TCP sender should send INIT_WINDOW worth of data, which will traverse the newly-established link.

For each subsequent ACK received, the TCP sender performs the mobile congestion response procedure, which in the illustrated embodiment utilizes no TCP options. Thus, when each ACK is received as determined at decision block 804, it is determined 806 whether the ACK packet sequence number is greater than high_out_old. Because high_out_old indicates the highest sequence number of data that was sent in the old subnet, decision block 806 thus determines whether the sequence number in the received ACK packet is greater than the highest sequence number of data that was sent in the old subnet. If so, the congestion response can ultimately follow established congestion response procedures, such as IETF RFC 2581 mentioned above, and IETF RFC 2988 (November 2000), entitled "Computing TCP's Retransmission Timer," by V. Paxson and M. Allman, the content of which is incorporated herein by reference.

However, it is first determined 808 whether the received ACK has a sequence number that is the next highest sequence number greater than high_out_old. If so, the timer is initialized 810. Such initialization may be effected pursuant to established techniques, such as described in IETF RFC 2988. More particularly, TCP uses a retransmission timer to guarantee data delivery in the absence of a response from the TCP receiver. The timer duration is referred to as the retransmission timeout (RTO), and initializing 810 the timer refers to the manner in which this retransmission timeout is set. In accordance with IETF RFC 2988, the TCP sender maintains two state variables, including the smoothed round-trip time (SRTT) and the round-trip time variation (RTTVAR). According to IETF RFC 2988, a number of rules govern the computation of SRTT, RTTVAR, and RTO. These rules include, for example, setting RTO to three seconds until a round-trip time (RTT) measurement has been made for a segment sent between the sender and receiver. This or any other suitable timer initialization procedure may be used to initialize 810 the timer.

Returning to FIG. 8A, the congestion window cwnd is set 812 equal to the INIT_WINDOW plus the number of packets acknowledged (ACK'd) after high_out_old. In accordance with one embodiment, even if packets less than high_out_old are ACK'd by this ACK packet, they should still be discarded. The SRTT, RTTVAR, and RTO variables are then reinitialized 814. This may be effected in any suitable manner, one of which is described in IETF RFC 2988. According to IETF RFC 2988, when the first RTT measurement (R) is made, the host sets the variables such that SRTT is set to R, RTTVAR is set to R/2, and RTO is set to SRTT plus the maximum of the clock granularity (G) and the product of K and RTTVAR, where K=4. When a subsequent RTT measurement (R') is made, the host sets RTTVAR and SRTT as shown in Equation 6 below:

$RTTVAR=(1-\text{beta})*RTTVAR+\text{beta}*|SRTT-R'|$ $SRTT=(1-\text{alpha})*SRTT+\text{alpha}*R'$  Equation 6 where alpha=⅛ and beta=¼. Because SRTT is used in the updated calculation of RTTVAR, the value of SRTT in this calculation is that prior to updating SRTT itself. After the computation, the host updates RTO to equal SRTT+the maximum of the clock granularity (G) and the product of K and RTTVAR. According to IETF RFC 2988, if the computed RTO is less than one second, then the RTO should be rounded up to one second. Further, a maximum value may be placed on the RTO. In accordance with one embodiment of the invention, all previous samples of SRTT, RTTVAR, and RTO are ignored. At this point, any typical or otherwise suitable congestion response may be performed 816, such as those described in IETF RFC 2581 and RFC 2988.

However, where it is determined at decision block 806 that the received ACK has a sequence number that is not the next highest sequence number greater than high_out_old, a different procedure is followed. This is depicted by link "A" 818A leading to link "A" 818B of FIG. 8B. In this case, no RTT samples are taken and the retransmission timer is not restarted, as shown at block 820. It is determined 822 whether the ACK is a duplicate ACK, which is indicative of congestion and/or packet loss. If the ACK is not a duplicate ACK, stale ACKs are ignored, and the congestion window thus is redefined as shown in block 824 and Equation 7 below:

$$cwnd = cwnd - \text{packets ACK'd} \qquad \text{Equation 7}$$

If it is determined 826 that the packets acknowledged (ACK'd) is greater than one, this indicates that some packet(s) were received after a loss. In this case, the state variable old_outstanding is defined as shown in block 828 and Equation 8 below:

$$\text{old\_outstanding} = \text{\#packets between lowest non-ACK'd packet and high\_out\_old} \qquad \text{Equation 8}$$

Processing can then return to monitor for the next received ACK, as depicted by links "B" 830B, 830A.

If it is determined 822 that the ACK is a duplicate ACK, it is determined 832 whether a state variable DUPLICATE_COUNT has reached the threshold, DUP_THRESHOLD. The DUPLICATE_COUNT variable corresponds to the number of duplicate ACKs received by the sender, and the DUP_THRESHOLD corresponds to a threshold signifying the number of packets that can be reordered in the network (typical default of three). If this variable has reached the threshold, the lost packet is sent 834. In either case, it is determined 836 whether old_outstanding<=0. If so, cwnd is incremented, otherwise old_outstanding is decremented 840, and processing returns to monitor for the next received ACK, as depicted by links "B" 830B, 830A.

The foregoing mobile congestion response methodology does not require the use of any TCP options. However, it requires various state variables in its operation, because the cumulative acknowledgement of TCP does not allow the TCP sender to determine which packet triggered the duplicate ACK—i.e., whether the packets on the old path or the packets on the new path were responsible for triggering the timeout. Furthermore, this mobile congestion response methodology may result in the TCP sender experiencing a timeout before a loss recovery completes. If the TCP timer expires before the high_out_old is acknowledged, then the TCP sender may, in one embodiment of the invention, follow a general loss recovery scheme such as that described in IETF RFC 2581.

Figure 9:
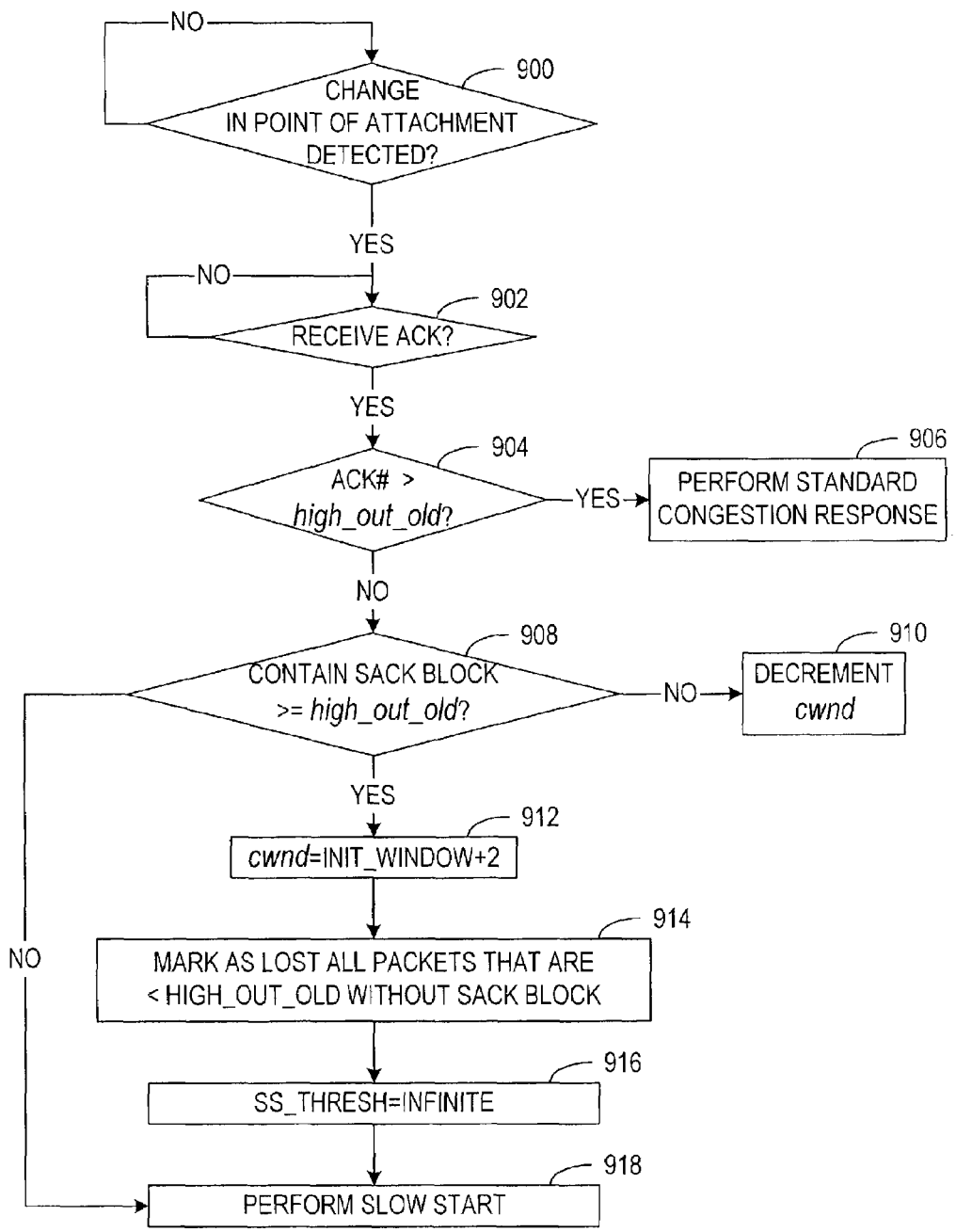
FIG. 9 is a flow diagram illustrating another embodiment of a method for providing a congestion response after mobility detection, where TCP options are utilized.

FIG. 9 is a flow diagram illustrating another embodiment of a method for providing a congestion response after mobility detection, where TCP options are utilized. This embodiment utilizes the TCP Selective Acknowledgment (SACK) option, which is known in the art. For example, the known SACK option is described in IETF RFC 2018 (October 1996), entitled "TCP Selective Acknowledgment Options," by M. Mathis, J. Mahdavi, S. Floyd, and A. Romanow, the content of which is incorporated herein by reference.

When a change in the point of attachment is detected as determined at decision block 900, and an ACK has been received as determined at decision block 902, it is determined 904 whether the ACK packet sequence number is greater than high_out_old. Because high_out_old indicates the highest sequence number of data that was sent in the old subnet, decision block 904 thus determines whether the sequence number in the received ACK packet is greater than the highest sequence number of data that was sent in the old subnet. If so, the congestion response can ultimately perform 906 established congestion response procedures, such as IETF RFC 2581 and IETF RFC 2988 mentioned above.

If it is determined 904 that the ACK packet sequence number is not greater than high_out_old, it is determined 908 whether the SACK block in the TCP options is greater than or equal to high_out_old. If not, for each non-duplicate ACK, cwnd is set to cwnd−1 as shown at block 910. If the SACK block in the TCP options is greater than or equal to high_out_old, cwnd is set 912 to INIT_WINDOW+2, and all packets less than high_out_old without a SACK block are marked 914 as lost. SS_THRESH is set 916 to INFINITE (e.g., 0xFFFF or other suitably large number), and a slow start is performed 918.

Figure 10:
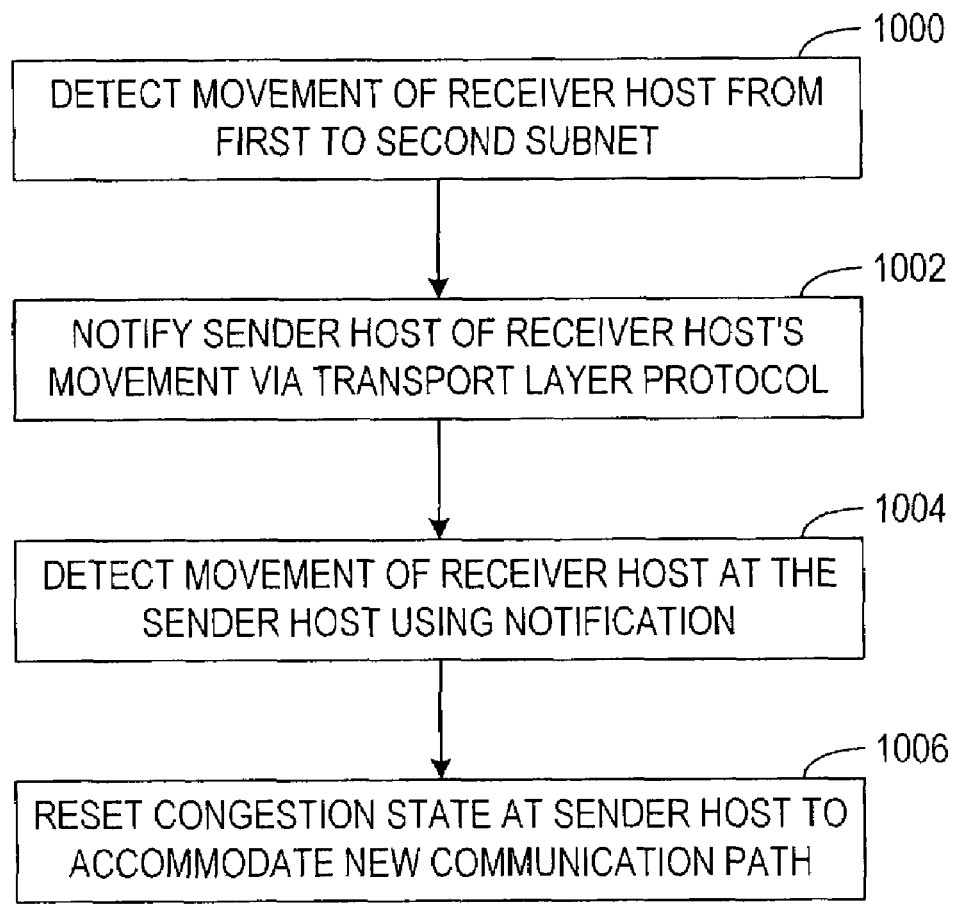
FIG. 10 is a flow diagram of an exemplary method in accordance with the present invention for determining network capacity and managing network congestion in response to a change in an end-to-end communication path between sender and receiver hosts.

The present invention thus provides a manner of detecting user mobility at the transport layer, and for providing an appropriate manner of responding in the event of the detection of user mobility. Using the present invention, the sender can detect the mobility of the receiver at the transport layer, regardless of the type of underlying network architecture (e.g., cellular networks, networks using various versions of Mobile-IP as a mobility manager, etc.). Further, the sender can reset its congestion state after there is a change(s) in the point of attachment (POA) of a receiver, which is not currently performed due to the sender having no way of reliably knowing of such a change in the receiver's POA. FIG. 10 is a flow diagram illustrating such features of the present invention, and more particularly illustrates a method for determining network capacity and managing network congestion in response to a change in an end-to-end communication path between sender and receiver hosts. Movement of the receiver host from a first to a second subnet is detected 1000. For example, the receiver host may determine its movement by monitoring a destination or routing cache. The movement of the receiver may result in a new end-to-end, transport layer communication path between the sender and receiver hosts. The sender host is notified 1002 of the receiver host's movement via the transport layer protocol, whether that be TCP, SCTP, or other connection-oriented transport protocol. The movement of the receiver host is detected 1004 at the sender host using the notification. In one embodiment of the invention, the notification is provided via a created "M flag" provided in the transport layer protocol header. The sender host resets 1006 its congestion state to accommodate the new communication path.

Figure 11:
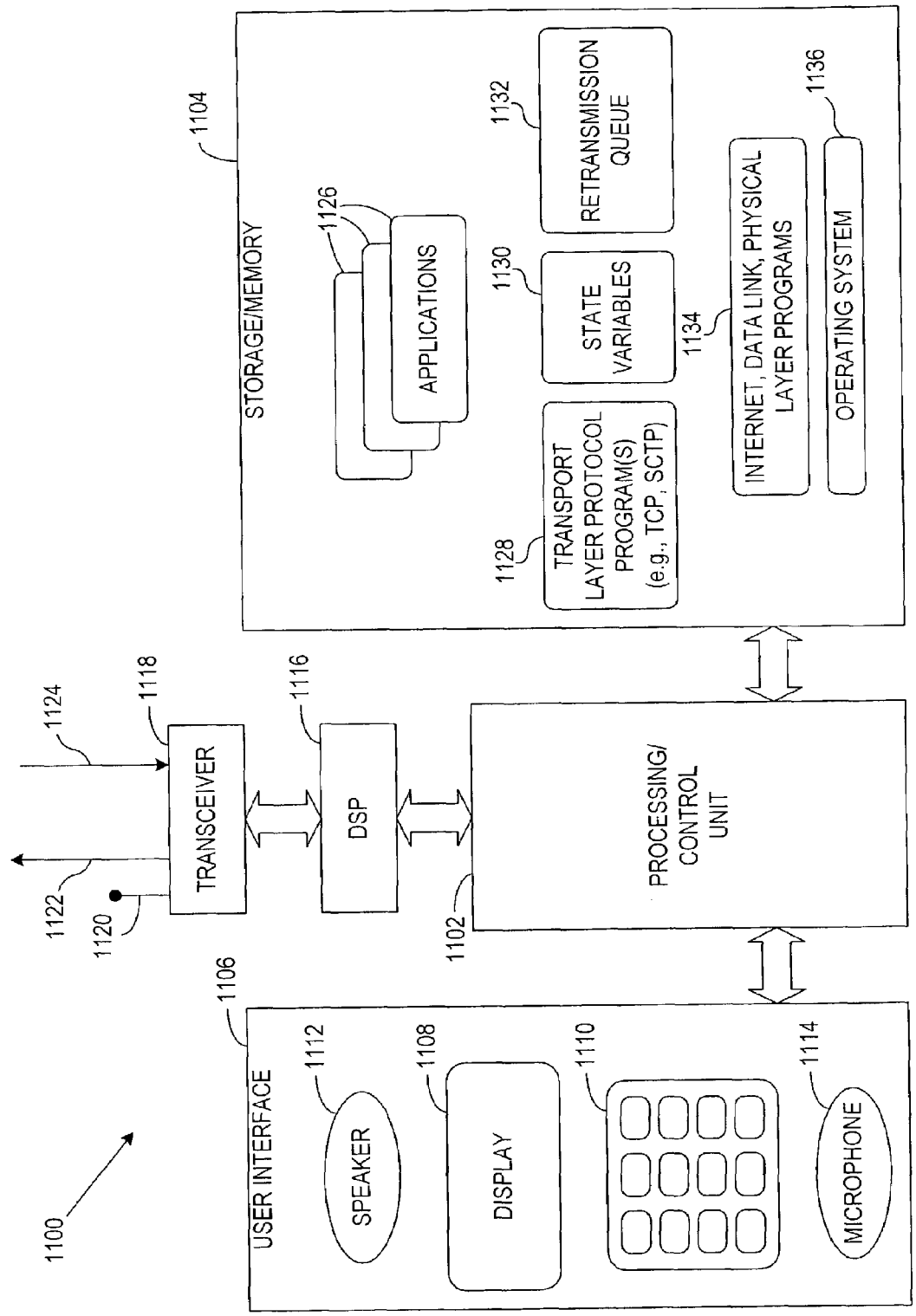
FIG. 11 is a block diagram of a representative mobile terminal computing system capable of carrying out operations in accordance with the invention.

The present invention may be used to facilitate communications to/from TCP, SCTP, or other transport layer protocol applications in any type of device that can communicate with the network or other connection. Such devices include computing devices such as desktop computers, workstations, laptop computers, or any other computing system capable of accessing information via a network. Such computing devices also include network servers, such as content servers, storage servers, Multimedia Messaging Service Centers (MMSC) for Multimedia Messaging Service (MMS), Short Message Service Centers (SMSC) for Short Message Service (SMS), or any other network element capable of communicating with other systems and devices over a network, such as the Internet. These devices also include mobile devices, where network access is accomplished via a wireless network that may or may not ultimately be coupled to a landline network. These mobile devices may be any type of wireless device, such as wireless/cellular telephones, personal digital assistants (PDAs), or other wireless handsets, as well as portable computing devices capable of wireless communication. These landline and mobile devices utilize computing circuitry and software to control and manage the conventional device activity as well as the functionality provided by the present invention. Hardware, firmware, software or a combination thereof may be used to perform the various mobility detection and congestion response operations described herein. An example of a representative mobile terminal computing system capable of carrying out operations in accordance with the invention is illustrated in FIG. 11. Those skilled in the art will appreciate that the exemplary mobile computing environment 1100 is merely representative of general functions that may be associated with such mobile devices, and also that landline computing systems similarly include computing circuitry to perform such operations.

The exemplary mobile computing arrangement 1100 suitable for performing the mobility detection and congestion response functions in accordance with the present invention may be associated with a number of different types of wireless devices. The representative mobile computing arrangement 1100 includes a processing/control unit 1102, such as a microprocessor, reduced instruction set computer (RISC), or other central processing module. The processing unit 1102 need not be a single device, and may include one or more processors. For example, the processing unit may include a master processor and associated slave processors coupled to communicate with the master processor.

The processing unit 1102 controls the basic functions of the mobile terminal as dictated by programs available in the program storage/memory 1104. Thus, the processing unit 1102 operating in connection with programs in the storage/memory 1104 is capable of executing mobility detection and congestion response functions associated with the present invention. The storage/memory may include one or more of read-only memory (ROM), flash ROM, programmable and/or erasable ROM, random access memory (RAM), subscriber interface module (SIM), wireless interface module (WIM), smart card, or other removable memory device, etc. In one embodiment of the invention, the program modules associated with the storage/memory 1104 are stored in non-volatile electrically-erasable, programmable ROM (EEPROM), flash ROM, etc. so that the information is not lost upon power down of the mobile terminal. The relevant software for carrying out conventional mobile terminal operations and operations in accordance with the present invention may also be transmitted to the mobile computing arrangement 1100 via data signals, such as being downloaded electronically via one or more networks, such as the Internet and an intermediate wireless network(s).

The processor 1102 is also coupled to user-interface 1106 elements associated with the mobile terminal. The user-interface 1106 of the mobile terminal may include, for example, a display 1108 such as a liquid crystal display, a keypad 1110, speaker 1112, and microphone 1114. These and other user-interface components are coupled to the processor 1102 as is known in the art. Other user-interface mechanisms may be employed, such as voice commands, switches, touch pad/screen, graphical user interface using a pointing device, trackball, joystick, or any other user interface mechanism.

The mobile computing arrangement 1100 also includes conventional circuitry for performing wireless transmissions. A digital signal processor (DSP) 1116 may be employed to perform a variety of functions, including analog-to-digital (A/D) conversion, digital-to-analog (D/A) conversion, speech coding/decoding, encryption/decryption, error detection and correction, bit stream translation, filtering, etc. The transceiver 1118, generally coupled to an antenna 1120, transmits the outgoing radio signals 1122 and receives the incoming radio signals 1124 associated with the wireless device.

In accordance with the present invention, the mobility detection and congestion response functionality may be implemented in, for example, transport layer programs. For example, the processor 1102 can provide the mobility detection and congestion response functionality under the direction of program modules stored in the program storage/memory 1104. Applications 1126 may represent device applications at the application layer, such as browsers, organizers, etc. Program modules 1128 associated with the transport layer functions are provided, such as TCP, SCTP, or other transport layer protocol software. In accordance with the present invention, such programs include instructions capable of performing operations previously described, such as manipulating the M flag in the TCP header, storing and utilizing state variables 1130, storing packets and manipulating the M flag for those packets stored in the retransmission queue 1132, etc. Other associated programs may be stored in the storage/memory 1104, such as internet layer (e.g., Internet Protocol), data link layer, and physical layer programs 1134, as well as an operating system 1136.

The mobile computing arrangement 1100 of FIG. 11 is provided as a representative example of a computing environment in which the principles of the present invention may be applied. From the description provided herein, those skilled in the art will appreciate that the present invention is equally applicable in a variety of other currently known and future mobile and landline computing environments. For example, desktop computing devices similarly include a processor, memory, a user interface, and data communication circuitry. Thus, the present invention is applicable in any known computing structure where data may be communicated via a network.

Using the description provided herein, the invention may be implemented as a machine, process, or article of manufacture by using standard programming and/or engineering techniques to produce programming software, firmware, hardware or any combination thereof. Any resulting program(s), having computer-readable program code, may be embodied on one or more computer-usable media, such as disks, optical disks, removable memory devices, semiconductor memories such as RAM, ROM, PROMS, etc. Articles of manufacture encompassing code to carry out functions associated with the present invention are intended to encompass a computer program that exists permanently or temporarily on any computer-usable medium or in any transmitting medium which transmits such a program. Transmitting mediums include, but are not limited to, transmissions via wireless/radio wave communication networks, the Internet, intranets, telephone/modem-based network communication, hard-wired/cabled communication network, satellite communication, and other stationary or mobile network systems/communication links. From the description provided herein, those skilled in the art will be readily able to combine software created as described with appropriate general purpose or special purpose computer hardware to create a mobility detection and congestion response system and method in accordance with the present invention.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather determined by the claims appended hereto.

What is claimed is:

1. A method for determining network capacity and managing network congestion in response to a change in an end-to-end communication path between a sender host and a receiver host, the method comprising:
   receiving at the sender host a receiver mobility notification from the receiver host by receiving a mobility flag in a header field of segments sent from the receiver host to the sender host, wherein receiving a mobility flag comprises receiving a mobility bit having a first state indicating no movement from a first subnet to a second subnet and a second state indicating movement from the first subnet to the second subnet;
   determining at the sender host whether the receiver host has moved from a first subnet to a second subnet using the receiver mobility notification; and
   resetting a congestion state at the sender host to correspond to a new end-to-end communication path between the sender host and the receiver host in the second subnet, if the sender host determines that the receiver host has moved from the first subnet to the second subnet; and
   receiving the mobility bit in the first state if the receiver host further moves from the second subnet to one of a third subnet or the first subnet.

2. A method for determining network capacity and managing network congestion in response to a change in an end-to-end communication path between a sender host and a receiver host, the method comprising:
   receiving at the sender host a receiver mobility notification from the receiver host;
   determining at the sender host whether the receiver host has moved from a first subnet to a second subnet using the receiver mobility notification;
   resetting a congestion state at the sender host to correspond to a new end-to-end communication path between the sender host and the receiver host in the second subnet, if the sender host determines that the receiver host has moved from the first subnet to the second subnet; and
   sending at least one data segment from the sender host to the receiver host and associating a sender-maintained state of the receiver mobility notification with a copy of the data segment, wherein receiving the receiver mobility notification from the receiver host comprises receiving the receiver mobility notification in an acknowledgment segment provided by the receiver host in response to the data segment.

3. The method of claim 2, wherein determining at the sender host whether the receiver host has moved using the receiver mobility notification comprises comparing the sender-maintained state of the receiver mobility notification with the receiver mobility notification received via the acknowledgment segment.

4. The method of claim 2, wherein associating the sender-maintained state with a copy of the data segment comprises setting the sender-maintained state of the receiver mobility notification in the copy of the data segment, and storing the copy of the data segment in a retransmission queue.

5. A method for determining network capacity and managing network congestion in response to a change in an end-to-end communication path between a sender host and a receiver host, the method comprising:
   receiving at the sender host a receiver mobility notification from the receiver host by receiving the receiver mobility notification in an acknowledgment segment which acknowledges a data segment previously sent from the sender host to the receiver host;
   determining at the sender host whether the receiver host has moved from a first subnet to a second subnet using the receiver mobility notification; and
   resetting a congestion state at the sender host to correspond to a new end-to-end communication path between the sender host and the receiver host in the second subnet, if the sender host determines that the receiver host has moved from the first subnet to the second subnet, wherein resetting a congestion state at the sender host comprises performing a standard congestion response if the segment sequence number of the acknowledgment segment is greater than the highest sequence number of non-acknowledged segments sent by the sender host.

6. The method of claim 5, further comprising initializing a retransmission timer, and resetting a congestion window prior to performing the standard congestion response, wherein resetting the congestion window comprises determining a sum of an initial value of the congestion window at initiation of a connection and a number of segments acknowledged after the segment corresponding to the highest sequence number of non-acknowledged segments sent by the sender host.

7. The method of claim 5, further comprising determining whether the acknowledgment segment includes a Selective Acknowledgment (SACK) block that is greater than or equal to the highest sequence number of non-acknowledged segments sent by the sender host, the determination occurring if the segment sequence number of the acknowledgment segment less than or equal to the highest sequence number of non-acknowledged segments sent by the sender host.

8. The method of claim 7, further comprising, if the acknowledgment segment includes a SACK block that is greater than or equal to the highest sequence number of non-acknowledged segments sent by the sender host:
   resetting a congestion window to a predetermined increase above an initial value of the congestion window at initiation of a connection;
   marking as lost all segments having a sequence number less than the highest sequence number of non-acknowledged segments sent by the sender host;
   setting a slow start threshold to a predetermined high value; and
   executing a slow start congestion response.

9. The method of claim 8, further comprising decrementing the congestion window, if the acknowledgment segment includes a SACK block that is less than the highest sequence number of non-acknowledged segments sent by the sender host.

10. A method for determining network capacity and managing network congestion in response to a change in an end-to-end communication path between a sender host and a receiver host, the method comprising:

receiving at the sender host a receiver mobility notification from the receiver host by receiving the receiver mobility notification in an acknowledgment segment which acknowledges a data segment previously sent from the sender host to the receiver host;

determining at the sender host whether the receiver host has moved from a first subnet to a second subnet using the receiver mobility notification; and resetting a congestion state at the sender host to correspond to a new end-to-end communication path between the sender host and the receiver host in the second subnet, if the sender host determines that the receiver host has moved from the first subnet to the second subnet, wherein resetting a congestion state at the sender host comprises determining whether the acknowledgment segment is a duplicate acknowledgment segment, if the segment sequence number of the acknowledgment segment is less than or equal to than the highest sequence number of non-acknowledged segments sent by the sender host.

11. The method of claim 10, further comprising resetting a congestion window by decreasing the congestion window by a number of segments that have been acknowledged, if the acknowledgment segment is not a duplicate acknowledgement segment.

12. The method of claim 11, further comprising establishing an estimate of a number of segments sent in a communication path between the sender host and the receiver host when in the first subnet by setting the estimate equal to a number of segments between the sequence number of the lowest non-acknowledged segment and the highest sequence number of non-acknowledged segments sent by the sender host.

13. The method of claim 10, further comprising sending a lost segment if the acknowledgment segment is a duplicate acknowledgment segment, and if a number of the duplicate acknowledgement segments received by the sender has reached a threshold signifying the number of packets that can be reordered in the network.

14. The method of claim 13, further comprising determining whether an estimate of a number of segments sent in a communication path between the sender host and the receiver host when in the first subnet is equal to zero, and if so, incrementing a congestion window.

15. The method of claim 13, further comprising determining whether an estimate of a number of segments sent in a communication path between the sender host and the receiver host when in the first subnet is equal to zero, and if not, decrementing the estimate.

16. A host device for communicating data with at least one remote device capable of moving from a first subnet to a second subnet during communication with the host device, the host device comprising:

a memory to store a remote subnet flag identifying a most recent state of the remote device's location known to the host device;

a retransmission queue of non-acknowledged transport layer segments sent from the host device to the remote device, wherein a state of the remote subnet flag at the time of transmitting the transport layer segments is stored with each of the transport layer segments in the retransmission queue; and a processor configured to compare the state of the remote subnet flags of the transport layer segments with a mobility flag in each corresponding acknowledgment segment provided by the remote device, and to reset a congestion state of a communication path between the host and remote devices if the mobility flag indicates relocation of the remote device from the first subnet to the second subnet.

17. The host device as in claim 16, wherein the processor is further configured to determine if the host device's point of attachment has changed, and wherein the memory further stores a local subnet flag indicative of whether the host device's point of attachment has changed.

18. The host device as in claim 17, wherein the processor is further configured to create a header including the local subnet flag as a mobility flag for the transport layer segments sent from the host device to allow the remote device to determine whether the host device has moved to a new subnet.

19. A system for facilitating data communication with at least one network comprising a plurality of subnets, the system comprising:

(a) at least one sender device for transmitting transport layer segments;

(b) at least one receiver device for receiving the transport layer segments;

(c) wherein the sender device comprises:

(i) a memory to store a remote subnet flag identifying a most recent state of the receiver device's location known to the sender device;

(ii) a retransmission queue of non-acknowledged transport layer segments sent from the sender device to the receiver device, wherein a state of the remote subnet flag at the time of transmitting the transport layer segments is stored with each of the transport layer segments in the retransmission queue; and (iii) a processor configured to compare the state of the remote subnet flags of the transport layer segments with a mobility flag in each corresponding acknowledgment segment provided by the receiver device, and to reset a congestion state of a communication path between the sender and receiver devices if the mobility flag indicates relocation of the receiver device from a first subnet to a second subnet.

20. The system of claim 19, further comprising a destination cache coupled to the receiver device to store receiver point of attachment information to the network, wherein the receiver device sets the mobility flag to a state dependent on whether the receiver point of attachment has changed.

21. The system of claim 19, wherein the network comprises one or more of a wireless and a landline network.

22. The system of claim 19, wherein the network comprises a cellular network comprising a plurality of cells, wherein each of the cells corresponds to one of the plurality of subnets.

* * * * *